(12) United States Patent
Higashiura

(10) Patent No.: US 8,437,015 B2
(45) Date of Patent: May 7, 2013

(54) IMAGE READING APPARATUS, IMAGE FORMING APPARATUS, IMAGE PROCESSING SYSTEM AND IMAGE READING METHOD

(75) Inventor: Masaki Higashiura, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1694 days.

(21) Appl. No.: 11/603,801

(22) Filed: Nov. 22, 2006

(65) Prior Publication Data

US 2007/0121174 A1 May 31, 2007

(30) Foreign Application Priority Data

Nov. 25, 2005 (JP) .................................. 2005-340778

(51) Int. Cl.
*H04N 1/38* (2006.01)
(52) U.S. Cl.
USPC ........... 358/1.13; 358/448; 358/474; 382/181
(58) Field of Classification Search .................... 358/1.1, 358/1.13, 1.14, 1.18, 448, 453, 474; 382/181
See application file for complete search history.

(56) References Cited

U.S. PATENT DOCUMENTS

| | | | | |
|---|---|---|---|---|
| 5,982,956 A | * | 11/1999 | Lahmi | 382/306 |
| 5,999,766 A | * | 12/1999 | Hisatomi et al. | 399/80 |
| 6,827,279 B2 | * | 12/2004 | Teraura | 235/492 |
| 7,571,323 B2 | * | 8/2009 | Iwamura et al. | 713/176 |
| 7,809,152 B2 | * | 10/2010 | Zhao et al. | 382/100 |
| 2002/0080959 A1 | * | 6/2002 | Weller | 380/55 |
| 2003/0025951 A1 | * | 2/2003 | Pollard et al. | 358/505 |
| 2003/0172266 A1 | * | 9/2003 | Lee | 713/168 |
| 2004/0179220 A1 | * | 9/2004 | Van Oosterhout | 358/1.13 |
| 2005/0200910 A1 | * | 9/2005 | Kanoshima et al. | 358/448 |
| 2006/0209326 A1 | * | 9/2006 | Higashiura | 358/1.9 |
| 2007/0160401 A1 | * | 7/2007 | Abe et al. | 400/62 |

FOREIGN PATENT DOCUMENTS

| | | |
|---|---|---|
| JP | 11-027444 | 1/1999 |
| JP | 2000-353171 | 12/2000 |
| JP | 2003-345760 | 12/2003 |

\* cited by examiner

*Primary Examiner* — Kimberly A Williams
(74) *Attorney, Agent, or Firm* — Edwards Wildman Palmer LLP; David G. Conlin; David A. Tucker

(57) ABSTRACT

An image reading apparatus, which has reading means for reading images recorded on sheets and carries out predetermined processing for the images read using the reading means, comprising first extracting means for extracting a plurality of predetermined patterns from the images read using the reading means, second extracting means for extracting the combination information regarding the combination of the patterns from the images read using the reading means, and judging means for judging whether the combination of a plurality of the patterns extracted using the first extracting means coincides with the combination information extracted using the second extracting means or not, the predetermined processing being carried out on the basis of the result of the judgment made using the judging means.

18 Claims, 32 Drawing Sheets

FIG. 2
FRONT SIDE OF FIRST SHEET
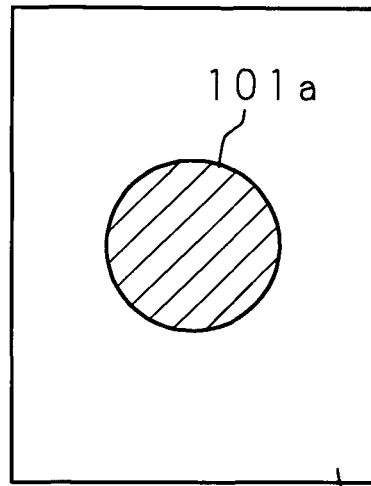
101a
BACK SIDE OF FIRST SHEET
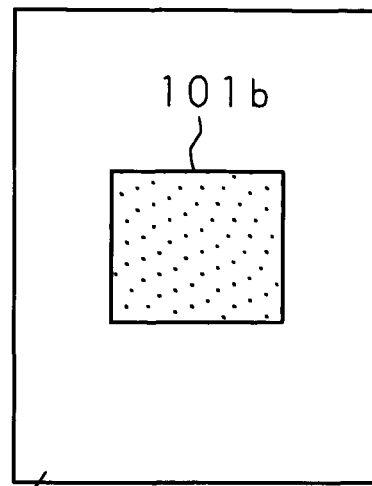
101b
101
FRONT SIDE OF SECOND SHEET
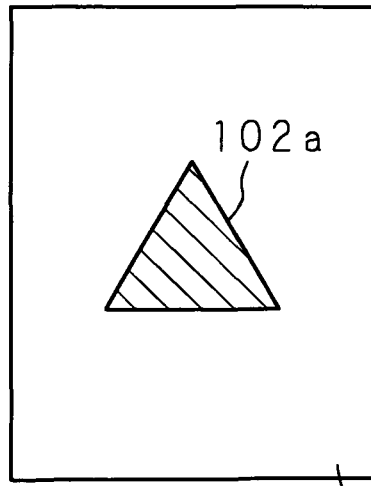
102a
BACK SIDE OF SECOND SHEET
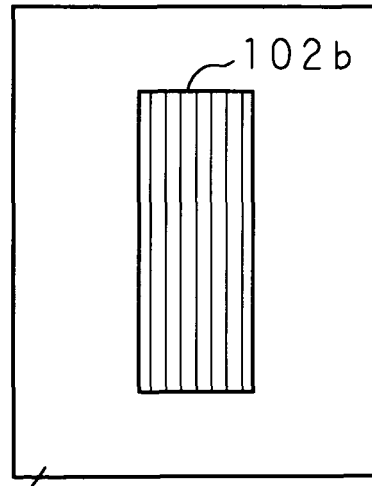
102b
102

FIG. 10
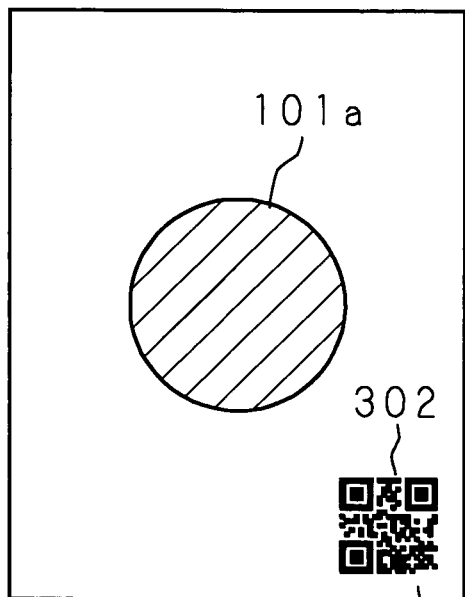
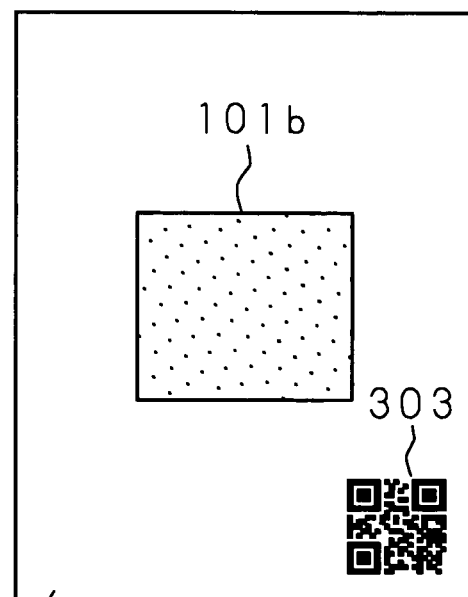
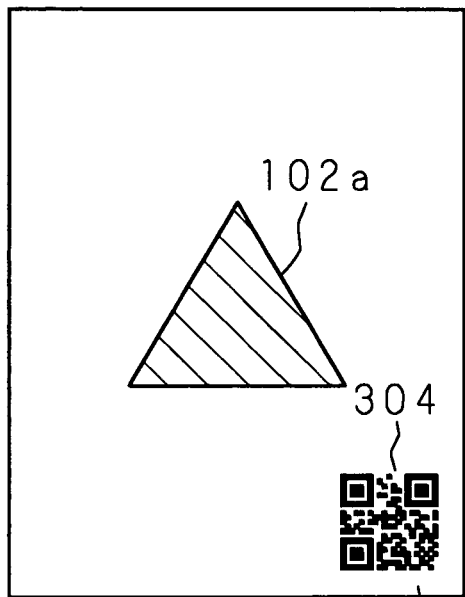
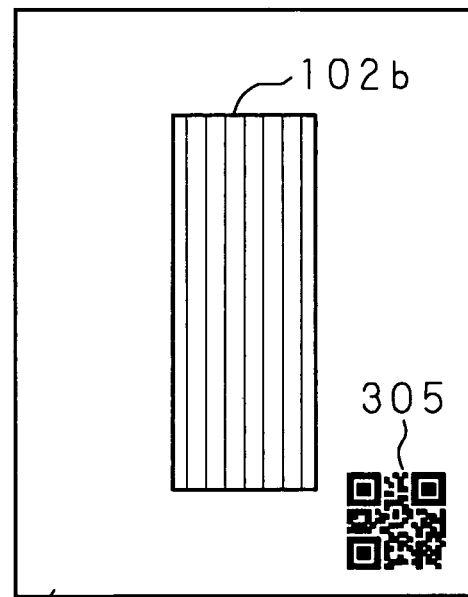

FIG. 11 AUTHENTICATION TABLE 161
| USER CODE | COMBINATION OF PATTERNS |
|---|---|
| 0001 |  |
| 0002 | 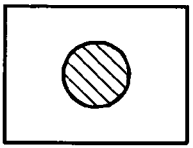 |
| 0003 | 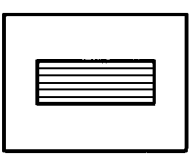 |
| ... | ... |

FIG. 12
SETTING TABLE 171
| SETTING CODE | ALIGNMENT ON ADF | ALIGNMENT ON OC | FUNCTION TO BE SET |
|---|---|---|---|
| F0001 | 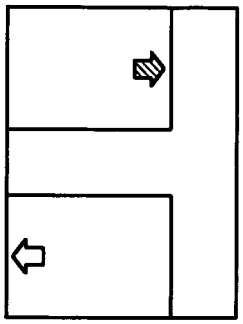 | 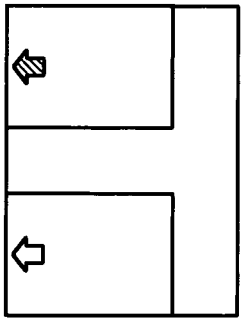 | TWO COPIES |
| F0002 | 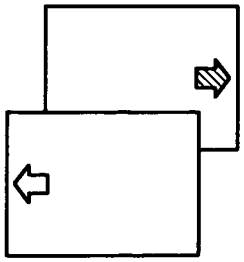 | 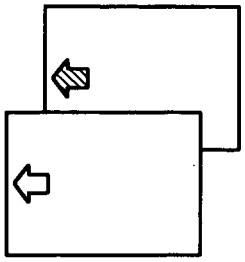 | IMAGE TRANSMISSION |
| ... | ... | ... | ... |

FIG. 13

RESTRICTION REMOVING TABLE 181

| RESTRICTION REMOVING TABLE | ALIGNMENT ON ADF | ALIGNMENT ON OC | FUNCTION FOR REMOVING RESTRICTION |
|---|---|---|---|
| C0001 | | | ADF OR OC DISABLING |
| C0002 | | | UPPER LIMIT OF THE NUMBER OF COPIES AT ADF |
| ... | ... | ... | ... |

F I G. 3 2
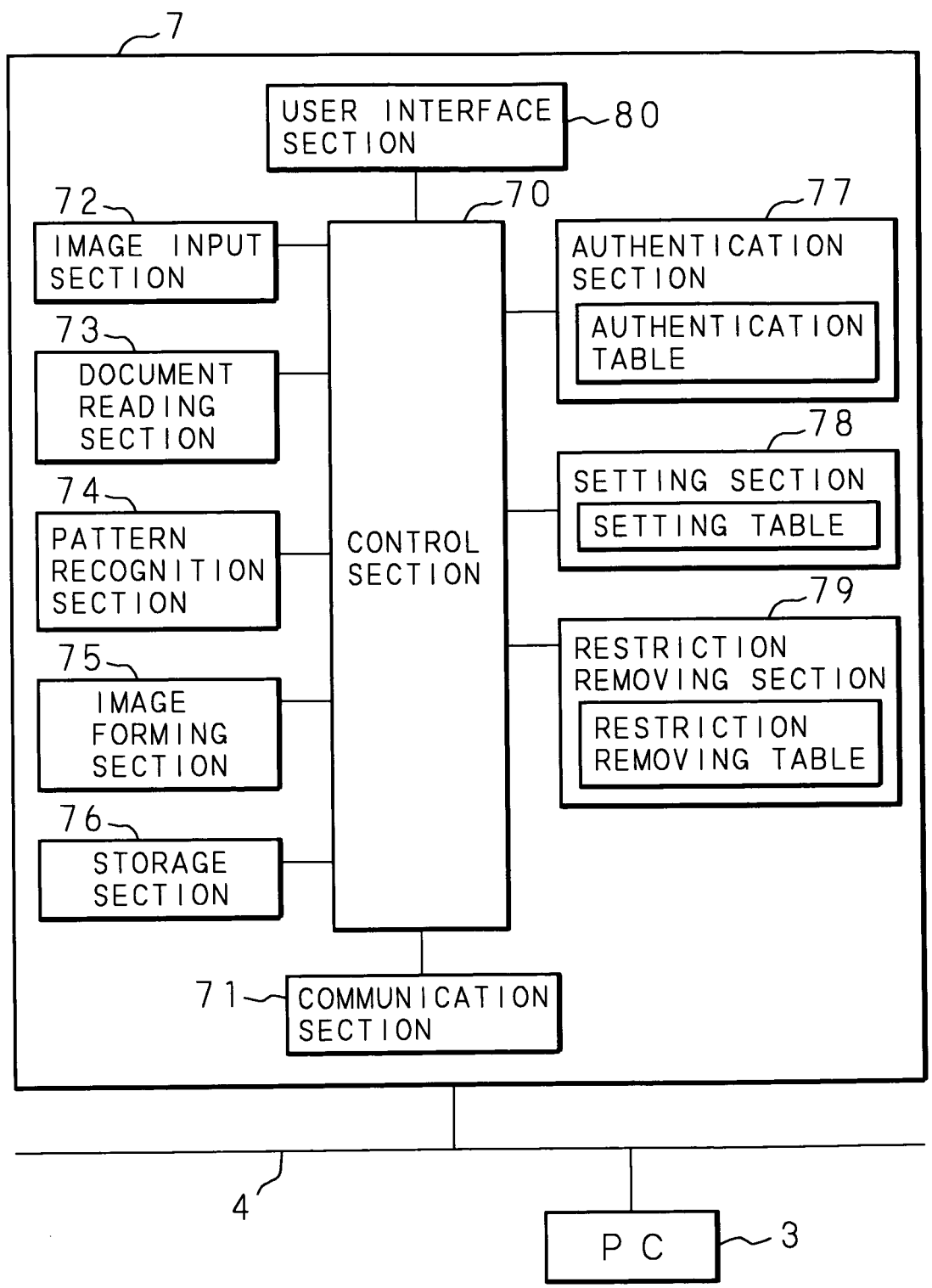

IMAGE READING APPARATUS, IMAGE FORMING APPARATUS, IMAGE PROCESSING SYSTEM AND IMAGE READING METHOD

CROSS-REFERENCE TO RELATED APPLICATIONS

This Nonprovisional application claims priority under 35 U.S.C. §119(a) on Patent Application No. 2005-340778 filed in Japan on Nov. 25, 2005, the entire contents of which are hereby incorporated by reference.

BACKGROUND OF THE INVENTION

1. Field of the Invention

The present invention relates to an image reading apparatus capable of carrying out user authentication, the function setting of the apparatus and the removal of restrictions on the functions of the apparatus using the front and back side sides of one sheet or using a combination of a plurality of sheets, to an image processing system having the image reading apparatus, to an image forming apparatus capable of creating sheets being used for the image reading apparatus and the image processing system, and to an image reading method.

2. Description of Related Art

In recent years, user authentication using a user interface, such as a touch panel, has been carried out increasingly. For example, user authentication is carried out in the case that data read using an image reading apparatus, such as a scanner, is printed using an image forming apparatus, such as a printer or a digital multifunctional apparatus, in the case that data read using a scanner is stored once in the hard disk drive of a printer or a digital multifunctional apparatus, and the recorded data is printed later, or in the case that required data stored in a server or a storage unit installed at a remote place is printed using a printer installed at an office or a convenience store where the user has visited.

However, because the user authentication using the touch panel of a printer or a digital multifunctional apparatus is not convenient for the user, various apparatuses have been proposed. For example, an apparatus has been proposed wherein a plurality of authentication codes (for example, bar codes) are printed beforehand on a kind of input medium (for example, paper), and the bar codes are read in a predetermined order using a bar code reader to carry out user authentication (refer to Japanese Patent Application Laid-open No. 2003-345760).

In addition, not only scanners or printers, but also digital multifunctional apparatuses in which a facsimile function is provided for copiers having a printing function have become widespread. These apparatuses are being made multifunctional as the image reading function or printing function is extended. Furthermore, an apparatus capable of quickly printing images based on data read using a scanner or data, such as document data or graphic data, created using an information processing apparatus, such as a personal computer, on sheets has been proposed. For example, an apparatus capable of simultaneously using two reading sections, that is, a book scanner section that reads data while documents are fixed and a sheet scanner section that reads data while documents are moved, has been proposed (refer to Japanese Patent Application Laid-open No. H11-27444).

However, the apparatus disclosed in Japanese Patent Application Laid-open No. 2003-345760 is required to be separately provided with a bar code reader for reading bar codes. In addition, in the case that the number of bar codes to be read is large, the order of reading the bar codes becomes complicated, the burden on the user increases. In the case that the number of bar codes is small, the apparatus has a problem because there is a danger that a third party may read the bar codes through trial and error and may be authenticated.

Furthermore, although the apparatus disclosed in Japanese Patent Application Laid-open No. H11-27444 can read or print documents at high speed, a user interface, such as a touch panel, must be used for user authentication, the function setting of the apparatus, etc. Hence, an apparatus capable of carrying out user authentication, the function setting of the apparatus, etc. more securely and easily has been demanded.

BRIEF SUMMARY OF THE INVENTION

In consideration of the circumstances described above, an object of the present invention is to provide an image reading apparatus capable of carrying out authentication securely and easily by carrying out predetermined processing on the basis of the result of a judgment as to whether the combination of multiple predetermined patterns extracted from images having been read coincides with the combination information regarding the combination of the patterns or not, to provide an image processing system having the image reading apparatus, to provide an image forming apparatus capable of creating sheets being used in the image reading apparatus or the image processing system, and to provide an image reading method.

In addition, another object of the present invention is to provide an image reading apparatus capable of reducing the number of sheets required for authentication by using a configuration wherein combination information is extracted from the images on the sheets from which the patterns are extracted, and to provide an image forming apparatus capable of creating sheets being used in the image reading apparatus.

Furthermore, still another object of the present invention is to provide an image reading apparatus capable of carrying out reading at high speed by using a configuration wherein, in the case that the combination of the patterns coincides with the combination information, the predetermined processing is carried out for the images recorded on the sheets that are read after the sheets from which the patterns or the combination information is extracted, and to provide an image forming apparatus capable of creating sheets being used in the image reading apparatus.

Moreover, yet still another object of the present invention is to provide an image reading apparatus capable of carrying out reading at high speed by using a configuration wherein, in the case that the combination of the patterns coincides with the combination information, the predetermined processing is carried out for the images recorded on the sheets that are read between a plurality of sheets from which the patterns or the combination information is extracted, and to provide an image forming apparatus capable of creating sheets being used in the image reading apparatus.

Besides, a further object of the present invention is to provide an image reading apparatus capable of carrying out authentication more securely by using a configuration wherein a plurality of patterns are extracted from the images on sheets read using one reading means and the combination information regarding the combination of the patterns is extracted from the images on sheets read using the other reading means, and to provide an image forming apparatus capable of creating sheets being used in the image reading apparatus.

Additionally, a still further object of the present invention is to provide an image reading apparatus capable of carrying out reading at high speed by using a configuration wherein, in the case that a plurality of the patterns extracted from the images on sheets read using one reading means coincide with the combination information regarding the combination of the patterns, the other reading means reads the images recorded on the sheets, and to provide an image forming apparatus capable of creating sheets being used in the image reading apparatus.

Additionally, a still further object of the present invention is to provide an image reading apparatus capable of carrying out authentication regardless of difference in the reading system of reading means by using a configuration wherein a plurality of sheets are read sequentially or simultaneously, and to provide an image forming apparatus capable of creating sheets being used in the image reading apparatus.

Additionally, a still further object of the present invention is to provide an image reading apparatus capable of preventing unauthorized use by providing prohibiting means for prohibiting the execution of the predetermined processing in the case that the combination of the patterns does not coincide with the combination information, and to provide an image forming apparatus capable of creating sheets being used in the image reading apparatus.

Additionally, a still further object of the present invention is to provide an image reading apparatus capable of preventing authentication information from easily leaking to any third party by providing means for decoding encrypted combination information, and to provide an image forming apparatus capable of creating sheets being used in the image reading apparatus.

Additionally, a still further object of the present invention is to provide an image reading apparatus capable of carrying out user authentication using the combination information that serves as the authentication information regarding the user, and to provide an image forming apparatus capable of creating sheets being used in the image reading apparatus.

Additionally, a still further object of the present invention is to provide an image reading apparatus capable of carrying out authentication in the case of function setting using the combination information that includes setting conditions for the processing, and to provide an image forming apparatus capable of creating sheets being used in the image reading apparatus.

Additionally, a still further object of the present invention is to provide an image reading apparatus capable of carrying out authentication in the case of function restriction removing using the combination information that includes restriction removing conditions for the processing, and to provide an image forming apparatus capable of creating sheets being used in the image reading apparatus.

Additionally, a still further object of the present invention is to provide an image reading apparatus and an image forming apparatus capable of creating sheets being used in the image reading apparatus.

Additionally, a still further object of the present invention is to provide an image reading apparatus capable of carrying out authentication more securely and easily using the combination information that includes the information regarding the order or positions of patterns, and to provide an image forming apparatus capable of creating sheets being used in the image reading apparatus.

Additionally, a still further object of the present invention is to provide an image forming apparatus capable of securely checking the method for using sheets being used for authentication by providing display means that displays the combination information regarding the combination of a plurality of patterns.

Additionally, a still further object of the present invention is to provide an image forming apparatus capable of easily storing the method for using sheets being used for authentication by providing means for outputting the combination information regarding the combination of a plurality of patterns to an external storage unit.

Additionally, a still further object of the present invention is to provide an image forming apparatus capable of creating sheets that can allow the usage method to be checked easily by using a configuration wherein decoded combination information is formed on the sheets.

Additionally, a still further object of the present invention is to provide an image forming apparatus capable of creating sheets that can allow the usage method to be checked easily by using a configuration wherein the information regarding the order or positions of the patterns is formed on sheets on which the patterns are formed.

The image reading apparatus according to the present invention, which has reading means for reading images recorded on sheets and carries out predetermined processing for the images read using the reading means, comprises first extracting means for extracting a plurality of predetermined patterns from the images read using the reading means, second extracting means for extracting the combination information regarding the combination of the patterns from the images read using the reading means, and judging means for judging whether the combination of a plurality of the patterns extracted using the first extracting means coincides with the combination information extracted using the second extracting means or not, the predetermined processing being carried out on the basis of the result of the judgment made using the judging means.

The image reading apparatus according to the present invention is characterized in that the second extracting means extracts the combination information from the images on sheets from which the patterns are extracted using the first extracting means.

The image reading apparatus according to the present invention is characterized in that, in the case that the judging means judges that there is coincidence, the predetermined processing is carried out for the images recorded on the sheets that are read after the sheets from which the patterns or the combination information is extracted.

The image reading apparatus according to the present invention, which has storage means for storing the images on the sheets read using the reading means, is characterized in that, in the case that the judging means judges that there is coincidence, the predetermined processing is carried out for the images on the sheets that are stored in the storage means and read between a plurality of sheets from which the patterns or the combination information is extracted.

The image reading apparatus according to the present invention, which has a plurality of reading means, is characterized in that the first extracting means extracts a plurality of patterns from the images on sheets read using one reading means, and that the second extracting means extracts the combination information regarding the combination of the patterns from the images on sheets read using the other reading means.

The image reading apparatus according to the present invention, which has a plurality of reading means, is characterized in that the first and second extracting means extract a plurality of patterns and the combination information regarding the combination of the patterns, respectively, from the images on sheets read using one reading means, and that, in the case that the judging means judges that there is coincidence, the other reading means reads the images recorded on the sheets.

The image reading apparatus according to the present invention is characterized in that the reading means reads a plurality of sheets sequentially or simultaneously.

The image reading apparatus according to the present invention has prohibiting means for prohibiting the execution of the predetermined processing in the case that the judging means judges that there is no coincidence.

The image reading apparatus according to the present invention has means for decoding encrypted combination information.

The image reading apparatus according to the present invention is characterized in that the combination information serves as the authentication information regarding the user, and that user authentication is carried out using the authentication information.

The image reading apparatus according to the present invention is characterized in that the combination information includes setting conditions for the processing, and that the image reading apparatus further comprises means for carrying out the setting for the processing that should be carried out according to the setting conditions.

The image reading apparatus according to the present invention is characterized in that the combination information includes restriction removing conditions for the processing, and the that image reading apparatus further comprises means for carrying out the restriction removing for the processing that should be carried out according to the restriction removing conditions.

The image reading apparatus according to the present invention is characterized in that the combination information includes the information regarding the order or positions of the patterns.

The image forming apparatus according to the present invention comprises image forming means for forming images read using the image reading apparatus according to the present invention on sheets.

The image forming apparatus according to the present invention further comprises displaying means for displaying the combination information regarding the combination of a plurality of the patterns.

The image forming apparatus according to the present invention further comprises means for outputting the combination information regarding the combination of a plurality of the patterns to an external storage unit.

The image forming apparatus according to the present invention is characterized in that the image forming means forms decoded combination information on sheets.

The image forming apparatus according to the present invention is characterized in that the image forming means forms the information regarding the order or positions of patterns on sheets on which the patterns are formed.

The image processing system according to the present invention, which has an image reading apparatus for reading images recorded on sheets and for carrying out the predetermined processing for the images having been read, and an information processing apparatus for making a judgment as to whether the processing being carried out using the image reading apparatus is possible or not, is characterized in that the reading apparatus comprises first extracting means for extracting a plurality of predetermined patterns from the images having been read, second extracting means for extracting the combination information regarding the combination of the patterns from the images having been read, and outputting means for outputting a plurality of the patterns and the combination information extracted using the two extracting means to the information processing apparatus, that the information processing apparatus comprises obtaining means for obtaining a plurality of the patterns and the combination information output from the outputting means, judging means for judging whether the combination of a plurality of the patterns obtained using the obtaining means coincides with the combination information obtained using the obtaining means, and that outputting means for outputting the result of the judgment of the judging means to the reading apparatus, and that the reading apparatus carries out the predetermined processing on the basis of the result of the judgment output from the outputting means.

The image reading method according to the present invention, for reading images recorded on sheets and carrying out the predetermined processing for the images having been read, extracts a plurality of predetermined patterns and the combination information regarding the combination of the patterns from the images having been read, judges whether the combination of the extracted a plurality of patterns coincides with the extracted combination information, and carrying out the predetermined processing on the basis of the result of the judgment.

In the present invention, the first extracting means extracts a plurality of predetermined patterns from images recorded on sheets (for example, paper media), and the second extracting means extracts the combination information regarding the combination of the patterns from the images recorded on the sheets. For example, in the case that the user instructs the reading means to read the images recorded on the sheets so that a plurality of the patterns shown as images recorded on the sheets have the combination shown as the images recorded on the sheets, the judging means judges that the combination of a plurality of the patterns extracted using the first extracting means coincides with the combination information extracted using the second extracting means, and the predetermined processing (for example, the copying of document sheets, the storage or transmission of the data read from the document sheets) is carries out. On the other hand, in the case that the user instructs the reading means to read the images recorded on the sheets so that a plurality of the patterns shown as images recorded on the sheets have a combination different from the combination shown as the images recorded on the sheets, the judging means judges that the combination of a plurality of the patterns extracted using the first extracting means does not coincide with the combination information extracted using the second extracting means.

In the present invention, even in the case that both a pattern and combination information are shown on one sheet, the second extracting means extracts the pattern and the combination information.

In the present invention, in the case that the user instructs the reading means to read images on sheets being overlaid so that document sheets are laid below sheets showing patterns or combination information, and when it is judged that the combination of a plurality of the patterns coincides with the combination information, the predetermined processing is carried out for the images on the document sheets read using the reading means.

In the present invention, in the case that the user instructs the reading means to read images on a plurality of sheets being overlaid so that document sheets are laid between sheets showing patterns or combination information, the storage means stores the images on the sheets having been read. When it is judged that the combination of a plurality of the patterns coincides with the combination information, the predetermined processing is carried out for the images on the document sheets stored using the storage means.

In the present invention, one reading means reads images on sheets showing patterns, and the other reading means reads images on sheets showing combination information. Hence, the user reads the sheets showing the patterns and the sheets showing the combination information using both the separate reading means together.

In the present invention, in the case that the user instructs one reading means to read images on sheets showing patterns or combination information, and instructs the other reading means to read document sheets, when it is judged that the combination of a plurality of the patterns coincides with the combination information, the other reading means reads the images recorded on the document sheets.

In the present invention, a plurality of sheets are read sequentially or simultaneously, whereby images on sheets are read using a method for reading a plurality of sheets sequentially or a method for reading a plurality of sheets placed in parallel.

In the present invention, in the case that it is judged that the combination of a plurality of patterns does not coincide with the combination information, the execution of the predetermined processing (for example, the copying of document sheets, the storage or transmission of the data read from the document sheets) is prohibited.

In the present invention, the images on the sheets showing encrypted combination information are read using the reading means, and the encrypted combination information is decoded.

In the present invention, because the combination information is the authentication information regarding the user, user authentication is carried out by reading the sheets including the information.

In the present invention, because the combination information includes setting conditions (for example, the copying or transmission of data) for the processing carried out by the apparatus, the processing is set by reading the sheets including the information.

In the present invention, because the combination information includes restriction removing conditions (for example, the enabling/disabling of the reading means, the upper limit of the number of copies) for the processing carried out by the apparatus, the restriction on the processing is removed by reading the sheets including the information.

In the present invention, because the combination information includes the information regarding the order or positions of patterns, the combination of the front and back sides of each sheet showing patterns, the overlaying order of a plurality of the sheets and the method for placing a plurality of the sheets on the reading means, for example, is determined.

In the present invention, the combination information regarding the combination of a plurality of patterns is displayed.

In the present invention, the combination information regarding the combination of a plurality of patterns is output to an external storage unit.

In the present invention, decoded combination information is formed on sheets, whereby sheets allowing the method for combining sheets showing patterns to be identified by the user are created.

In the present invention, on sheets on which patterns are formed, the information regarding the order or positions of the patterns is formed, whereby sheets allowing the user to easily combine the sheets showing the patterns are created in the case that the user combines the sheets showing the patterns.

In the present invention, the first extracting means extracts a plurality of patterns from images recorded on sheets, and the second extracting means extracts the combination information regarding the combination of the patterns from the images recorded on the sheets. The reading apparatus outputs the extracted patterns and combination information to the information processing apparatus. The information processing apparatus obtains the patterns and combination information, and outputs, to the reading apparatus, the result of the judgment as to whether the combination of the obtained a plurality of patterns coincides with the combination information or not. On the basis of the result of the judgment having been output, the reading apparatus carries out the predetermined processing (for example, the copying of document sheets, the storage and transmission of the data read from the document sheets).

In the present invention, on the basis of the result of the judgment as to whether the combination of a plurality of the predetermined patterns extracted from the images having been read coincides with the combination information regarding the combination of the patterns, the predetermined processes is carried out. Hence, even if one or more sheets on which the patterns are recorded are stolen or copied, the method for combining the sheets is not leaked. Authentication for carrying out the predetermined processing is done only after both of the sheets on which the patterns are recorded and the combination information of the patterns are obtained completely. Therefore, this method that requires two items for authentication is improved in security against unauthorized use in comparison with a method that requires only one item. In addition, because authentication can be carried out by extracting the patterns recorded on sheets and the combination information of the patterns, a separate device, such as a bar code reader, is not required, and input operation at such a touch panel is not required either. Furthermore, it is only necessary to use sheets that are read using reading means. Therefore, authentication can be done easily at low cost, and the convenience for the user is improved.

In the present invention, even in the case that both a pattern and combination information are shown on one sheet, the pattern and the combination information can be extracted. Hence, it is not necessary to use sheets showing the combination information, and the number of sheets required for authentication can be reduced.

In the present invention, in the case that the user instructs the reading means to read images on sheets being overlaid so that document sheets are laid below sheets showing patterns or combination information, and when it is judged that the combination of a plurality of the patterns coincides with the combination information, the reading means reads the images on the document sheets, and the predetermined processing is carried out for the images having been read. Hence, the reading of the sheets for authentication and the reading of the document sheets can be carried out continuously. Therefore, authentication can be carried out when the document sheets are read, and quick reading can be carried out.

In the present invention, in the case that the user instructs the reading means to read images on a plurality of sheets being overlaid so that document sheets are laid between sheets showing patterns or combination information, and when it is judged that the combination of a plurality of the patterns coincides with the combination information, the predetermined processing is carried out for the images on the document sheets stored. Hence, the reading of the sheets for authentication and the reading of the document sheets can be carried out continuously. Therefore, authentication can be carried out when the document sheets are read, and quick reading can be carried out.

In the present invention, a plurality of the patterns are extracted from the images on sheets read using one reading means, and the combination information regarding the combination of the patterns is extracted from the images on sheets read using the other reading means. With this configuration, both the two reading means are used together for authentication, whereby more secure authentication can be carried out.

In the present invention, in the case that the combination of a plurality of the patterns and the combination information regarding the combination of the patterns, extracted from the images on sheets read using one reading means, coincides with each other, the other reading means reads the images recorded on document sheets. With this configuration, the reading of the sheets for authentication and the reading of the document sheets can be carried out simultaneously. Therefore, quick reading can be carried out.

In the present invention, a plurality of sheets are read sequentially or simultaneously. With this configuration, a method for reading the front and back sides of one sheet in order, a method for reading a plurality of sheets in order or a method for reading a plurality of sheets in parallel can be used.

In the present invention, a prohibiting means is provided to prohibit the execution of the predetermined processing in the case that the combination of the patterns shown on sheets does not coincide with the combination information. Hence, in the case that authentication is not obtained owing to unauthorized use, the execution of the predetermined processing is prohibited, and unauthorized use can be prevented.

In the present invention, means for decoding encrypted combination information is provided. Hence, encrypted combination information can be used on sheets, and authentication information can be prevented from easily leaking to any third party.

In the present invention, because the combination information serves as the authentication information regarding the user, user authentication can be carried out using the information.

In the present invention, the combination information includes setting conditions for the processing. Hence, in the case of setting functions, complicated operations at a touch panel are not required, and easy authentication can be carried out.

In the present invention, the combination information includes restriction removing conditions for the processing. Hence, in the case of removing the restriction on a function, complicated operations at a touch panel are not required, and easy authentication can be carried out. For example, it is also possible that, in the case that a plurality of reading means are provided, only while authentication is obtained using one reading means, the other reading means are enabled.

In the present invention, because the combination information includes the information regarding the order or positions of patterns, the combination of the front and back sides of each sheet showing patterns, the overlaying order of a plurality of the sheets and the method for placing a plurality of the sheets on the reading means, for example, can be determined. Therefore, authentication can be carried out more securely and easily In the present invention, because displaying means for displaying the combination information regarding the combination of a plurality of patterns is provided, in the case that sheets are created, for example, only the user can securely check the usage method of sheets that are used for authentication.

In the present invention, means for outputting the combination information regarding the combination of a plurality of patterns to an external storage unit is provided. Hence, the usage method of sheets that are used for authentication can be stored as data in the external storage unit, and the stored data can be used later, whereby the usage method of sheets that are used for authentication can be stored easily. Furthermore, even if the user forgot the usage method, the user can easily check the usage method.

In the present invention, decoded combination information is formed on sheets. Hence, a sheet (explanation sheet) allowing the user to easily check the usage method can be created, and the user can instruct the reading means to read sheets for authentication while looking at the explanation sheet.

In the present invention, on sheets on which patterns are formed, the information regarding the order or positions of the patterns is formed. With this configuration, a sheet allowing the user to easily check the usage method can be created, and the user can instruct the reading means to easily read sheets for authentication.

In the present invention, the patterns and the combination information extracted using the reading means are output to the information processing apparatus, and a judgment is made in the information processing apparatus as to whether the combination of the obtained a plurality of patterns coincides with the combination information or not. Hence, it is not necessary to carried out authentication processing in the image reading apparatus. Therefore, for example, in the case that a plurality of reading means are provided, the authentication processing that is carried out by the user in the respective reading means can be carried out concentratedly using the information processing apparatus. Hence, information control for authentication is made easy.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic view showing examples of authentication sheets;

FIG. 10 shows an example wherein QR codes are attached on authentication sheets for authentication;

FIG. 11 is a conceptual view showing the content of an authentication table;

FIG. 12 is a conceptual view showing the content of a setting table;

FIG. 13 is a conceptual view showing the content of a restriction removing table;

FIG. 32 is a block diagram showing the internal configuration of a digital multifunctional apparatus according to Embodiment 3.

DETAILED DESCRIPTION OF THE INVENTION

Embodiment 1

Figure 1:
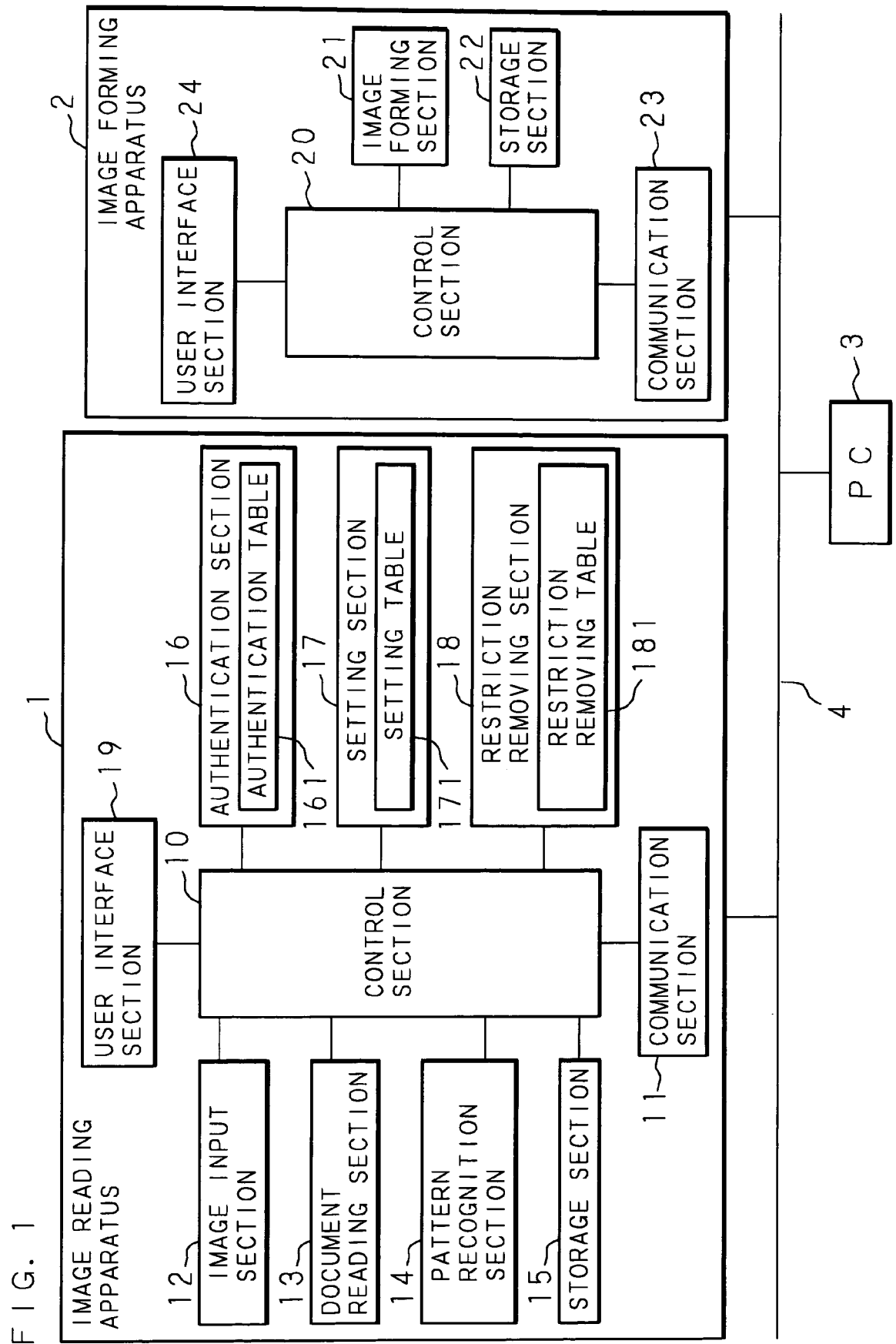
FIG. 1 is a block diagram showing the internal configurations of an image reading apparatus and an image forming apparatus according to the present invention.

The present invention will be described below referring to the drawings showing embodiments thereof. FIG. 1 is a block diagram showing the internal configurations of an image reading apparatus and an image forming apparatus according to the present invention. In FIG. 1, numeral 1 designates an image reading apparatus, such as a scanner. The image reading apparatus 1 has a control section 10 comprising a CPU that performs various calculations, a built-in memory, etc. To the control section 10, a communication section 11, an image input section (OC) 12, a document reading section (ADF) 13, a pattern recognition section 14, a storage section 15, an authentication section 16, a setting section 17, a restriction removing section 18, a user interface section 19, etc. are connected via internal buses, and the control section 10 controls the operations of these hardware sections.

To the image reading apparatus 1, an image forming apparatus 2, such as a printer, and a personal computer (PC) 3 that functions as the terminal unit of a user are connected via a communication line 4. The image forming apparatus 2 has a control section 20 comprising a CPU that performs various calculations, a built-in memory, etc. To the control section 20, an image forming section 21, a storage section 22, a communication section 23, a user interface section 24, etc. are connected via internal buses, and the control section 20 controls the operations of these hardware sections.

The control section 10 has a ROM in which a control program indicating the control procedure thereof is stored beforehand, and also has a RAM in which data being created during the execution of the control program is stored. The CPU of the control section 10 loads the control program stored in the ROM into the RAM, and the control section 10 controls the operation of the image reading apparatus 1 according to the control procedure indicated in the control program.

The image input section 12 has a glass plate on which a sheet to be read (an authentication sheet, an explanation sheet, a document sheet, a function setting sheet, a function restriction removing sheet, etc.) is placed, a light source for applying light to the sheet placed on the plate, an image sensor formed of a CCD, an A/D converter, etc., and reads the image recorded on the sheet placed on the plate.

The image input section 12 converts the image recorded on the sheet placed at a predetermined reading position into an analog signal by performing photoelectric conversion using an image sensor, and converts the obtained analog signal into a digital signal using an A/D converter. The image input section 12 corrects the digital signal obtained by the conversion, with respect to the orientation characteristics of the light source, the uneven sensitivity of the image sensor, etc. at the time of sheet reading. The image input section 12 then stores the obtained image data in the storage section 15 under the control of the control section 10.

The document reading section 13 is the so-called automatic document feeder (ADF) and has a transfer path along which a sheet to be read (an authentication sheet, an explanation sheet, a document sheet, a function setting sheet, a function restriction removing sheet, etc.) is transferred, a light source for applying light to both sides of the sheet being moved along the transfer path, an image sensor formed of a CCD, an A/D converter, etc. and reads the image recorded on the sheet being moved along the transfer path.

The document reading section 13 sequentially reads the front and back sides of one or plurality of sheets overlaid, converts the image recorded on the sheet into an analog signal by performing photoelectric conversion using an image sensor, and converts the obtained analog signal into a digital signal using an A/D converter. The document reading section 13 corrects the digital signal obtained by the conversion, with respect to the orientation characteristics of the light source, the uneven sensitivity of the image sensor, etc. at the time of sheet reading. The document reading section 13 then stores the obtained image data in the storage section 15 under the control of the control section 10 in the order of acquisition.

The communication section 11 has a network interface for communicating with the personal computer (PC) 3 or the image forming apparatus 2, a facsimile communication interface for facsimile communicating with an external facsimile machine, etc.

The storage section 15 is formed of an HDD unit, for example, and stores image data obtained using the image input section 12 or the document reading section 13.

The user interface section 19 is a touch-panel type operation panel, and has an operation section for receiving operation instructions from the user, and a liquid crystal display device for displaying information to be transmitted to the user.

The pattern recognition section 14, the authentication section 16, the setting section 17 and the restriction removing section 18 are each formed of an ASIC. From image data stored in the in the storage section 15, the pattern recognition section 14 extracts patterns and the combination information regarding the combination of the patterns under the control of the control section 10. In other words, the pattern recognition section 14 extracts the patterns recorded on an authentication sheet, and also extracts the combination information regarding the combination of a plurality of patterns recorded on an explanation sheet or the combination information recorded in a QR code. The edge detection method or the like can be used to extract the patterns and the combination information. The pattern recognition section 14 outputs the extracted patterns and combination information to the authentication section 16, the setting section 17, and the restriction removing section 18.

FIG. 2 is a schematic view showing examples of authentication sheets. In the examples shown in FIG. 2, authentication is carried out by combining two authentication sheets 101 and 102. The authentication sheets 101 and 102 are used for user authentication, authentication for function setting or authentication for function restriction removing. A circular pattern 101*a* designed or colored appropriately is recorded on the front side of the first authentication sheet 101, and a square pattern 101*b* designed or colored appropriately is recorded on the back side of the first authentication sheet 101. Furthermore, a triangular pattern 102*a* designed or colored appropriately is recorded on the front side of the second authentication sheet 102, and a rectangular pattern 102*b* designed or colored appropriately is recorded on the back side of the second authentication sheet 102.

Figure 3:
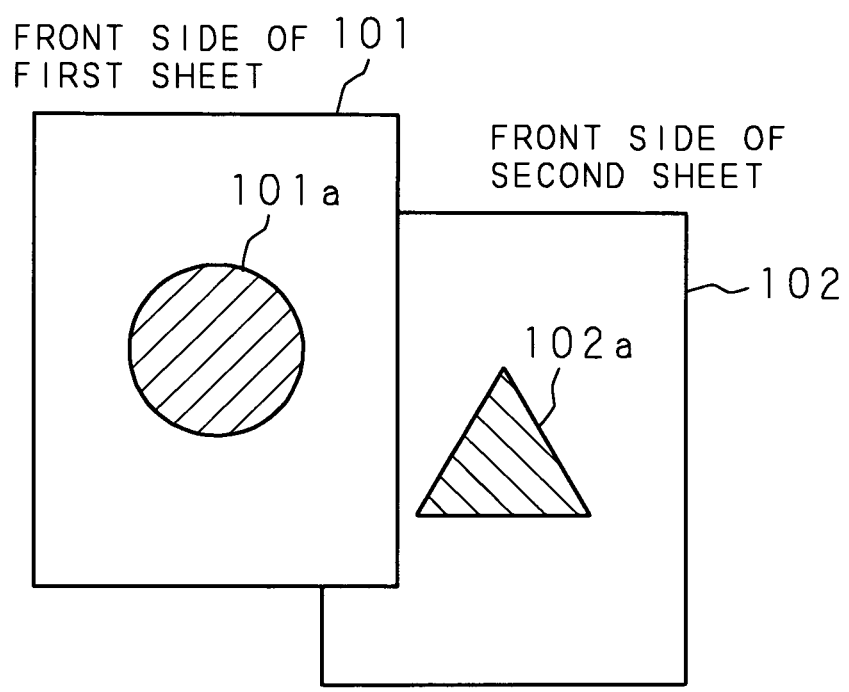
FIG. 3 is a schematic view showing an example of the combination of authentication sheets.

FIG. 3 is a schematic view showing an example of the combination of authentication sheets. In the example shown in FIG. 3, the two authentication sheets 101 and 102 are overlaid and placed on the document reading section 13, and the patterns on the sheets are read. The document reading section 13 reads the pattern on the front side and the pattern on the back side of the first authentication sheet 101 in this order. Next, the document reading section 13 reads the pattern on the front side and the pattern on the back side of the second authentication sheet 102 in this order. In other words, the pattern recognition section 14 extracts patterns 101*a*, 101*b*, 102*a* and 102*b* in this order.

Figure 4:
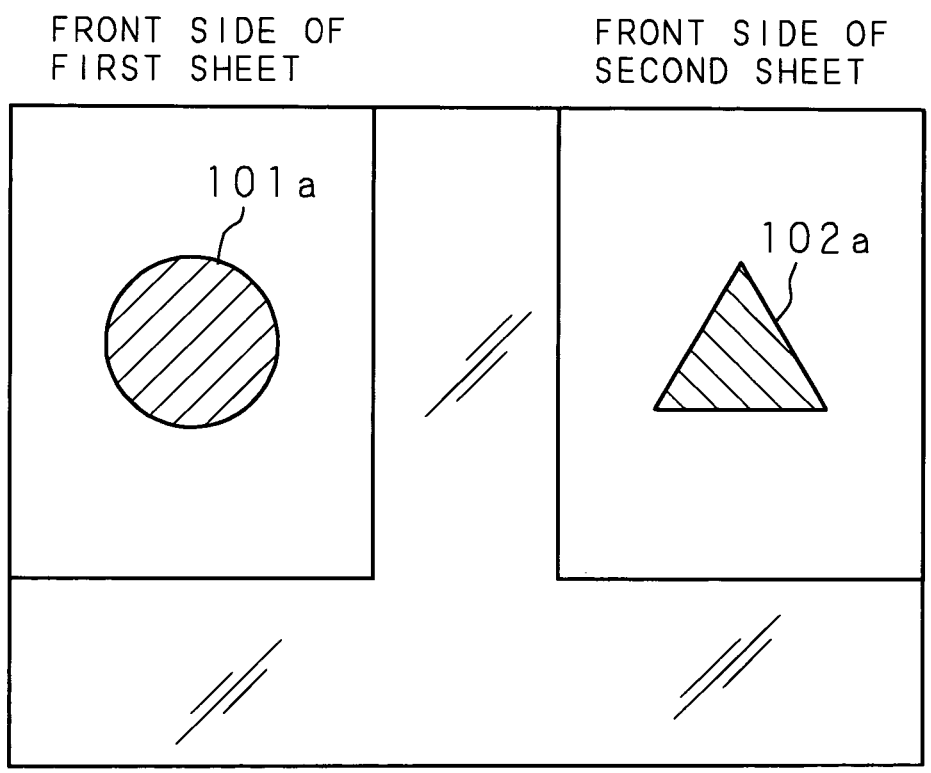
FIG. 4 is a schematic view showing another example of the combination of authentication sheets.

FIG. 4 is a schematic view showing another example of the combination of authentication sheets. In the example shown in FIG. 4, the two authentication sheets 101 and 102 are placed on the plate of the image input section 12, and the patterns on the sheets are read. The authentication sheets 101 and 102 are placed so as to be spaced therebetween while their front sides are oriented upward. In other words, the image input section 12 simultaneously reads the patterns 101*a* and 102*a* on the front sides of the authentication sheets 101 and 102. As a result, the pattern recognition section 14 simultaneously extracts the patterns 101*a* and 102*a*.

Figure 5:
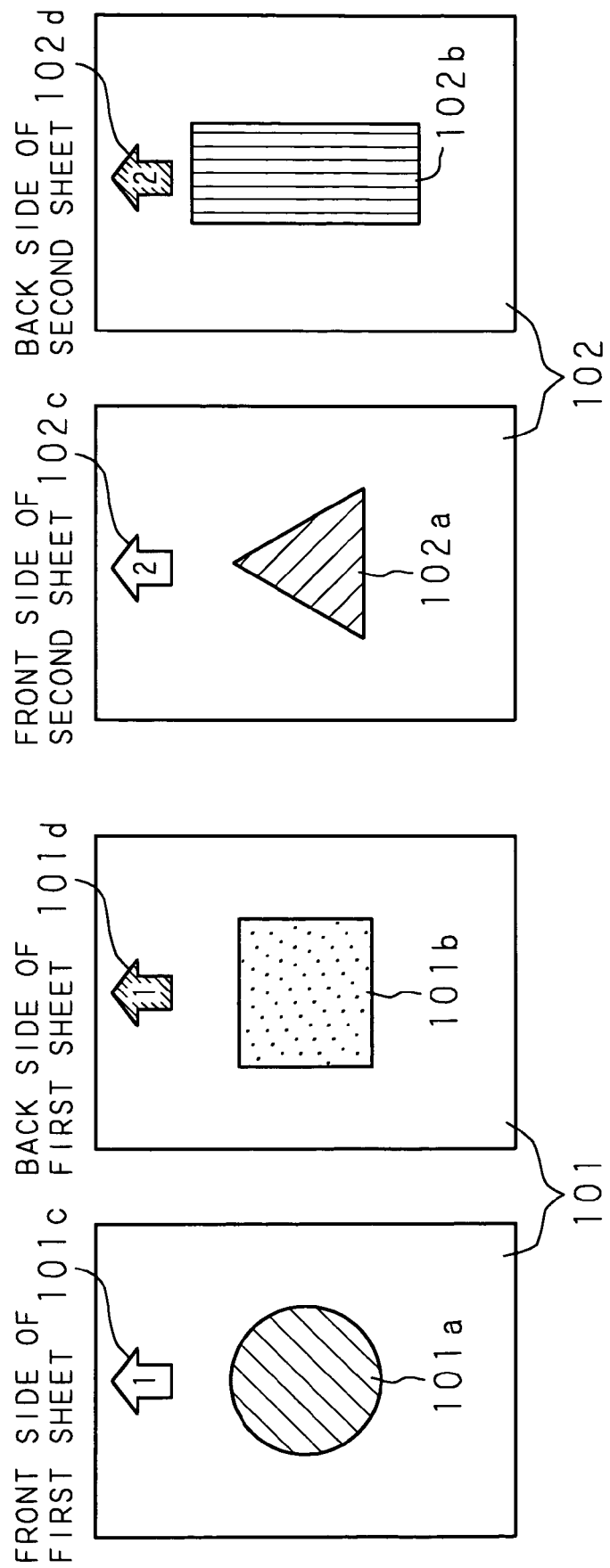
FIG. 5 is a schematic view showing other examples of authentication sheets.

FIG. 5 is a schematic view showing other examples of authentication sheets. In the example shown in FIG. 5, the two authentication sheets 101 and 102 are combined and used for authentication. The circular pattern 101*a* designed or colored appropriately and an indicator 101*c* showing the orientation (upper-lower/left-right orientation), the side (front/rear side) and the page number of the sheet are recorded on the front side of the first authentication sheet 101. More specifically, the direction of the arrow of the indicator 101*c* indicates the upper direction of the sheet, the design or color indicates the front/rear side of the sheet, and the number inside the arrow indicates a page number. The square pattern 101*b* designed or colored appropriately and an indicator 101*d* are recorded similarly on the back side of the first authentication sheet 101.

In addition, the triangular pattern 102*a* designed or colored appropriately and an indicator 102*c* showing the orientation (upper-lower/left-right orientation), the side (front/rear side) and the page number of the sheet are recorded on the front side of the second authentication sheet 102. The rectangular pattern 102*b* designed or colored appropriately and an indicator 102*d* are recorded similarly on the back side of the second authentication sheet 102.

Figure 6:
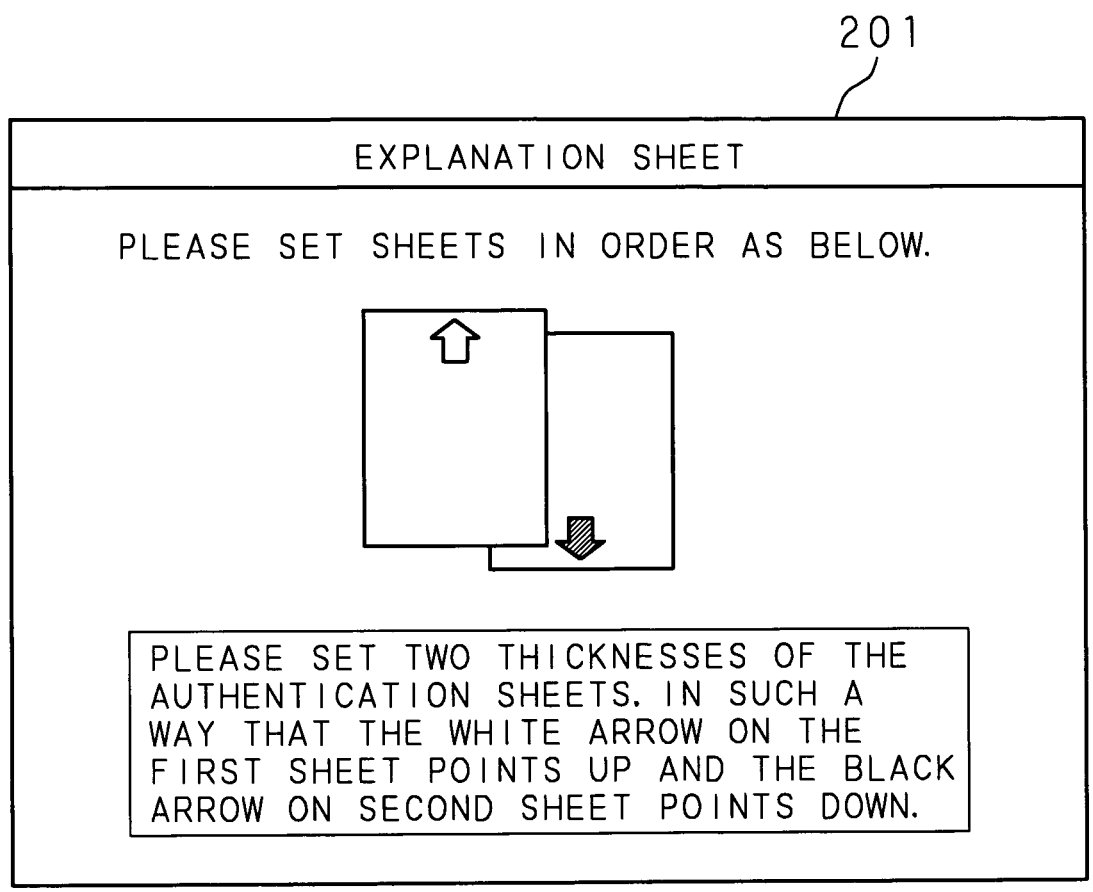
FIG. 6 is a schematic view showing an example of an explanation sheet for authentication.

FIG. 6 is a schematic view showing an example of an explanation sheet for authentication. The explanation sheet 201 shown in FIG. 6 states that two authentication sheets are overlaid in order, placed on the document reading section 13 and then read. Furthermore, the indicators on the authentication sheets indicate the order of reading the two authentication sheets and the orientations of the two authentication sheets when the sheets are placed on the document reading section 13.

Figure 7:
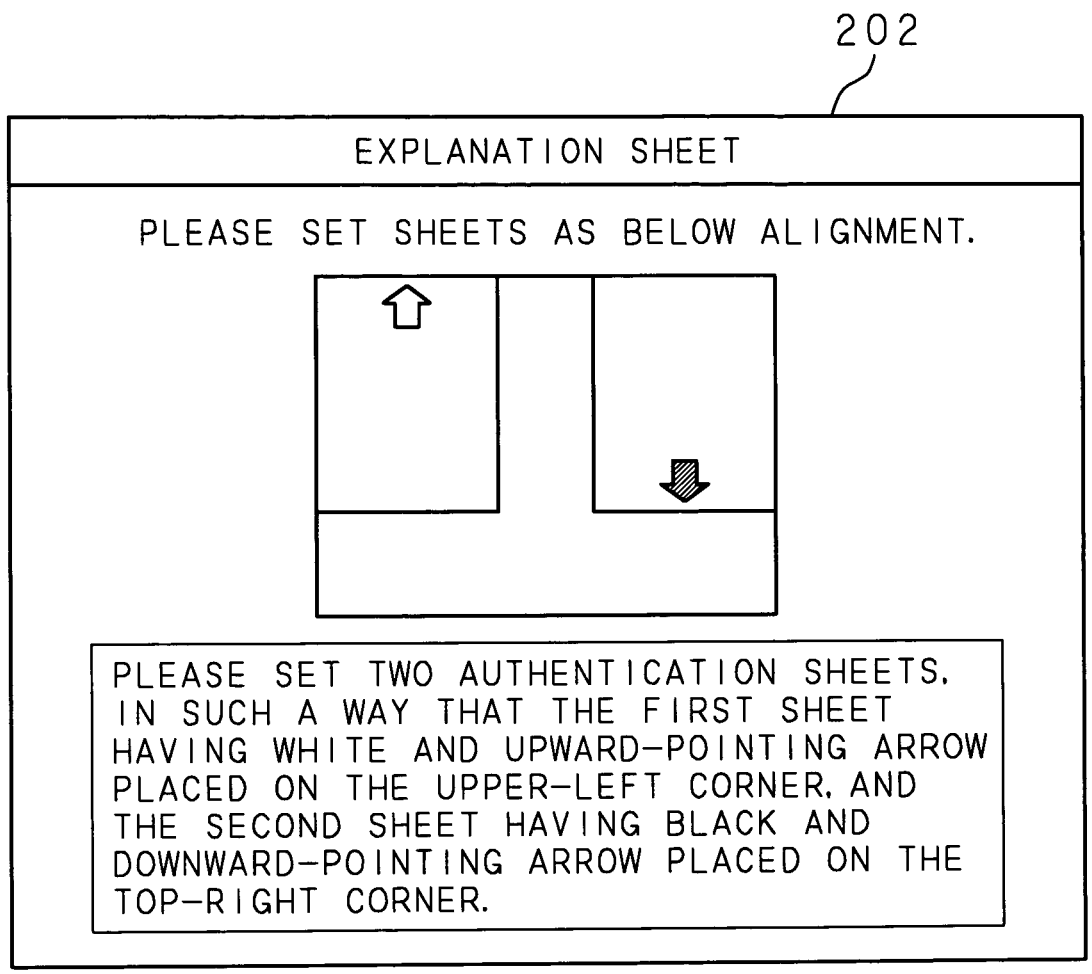
FIG. 7 is a schematic view showing another example of an explanation sheet for authentication.

FIG. 7 is a schematic view showing another example of an explanation sheet for authentication. The explanation sheet 202 shown in FIG. 7 states that two authentication sheets are placed on the plate of the image input section 12 and then read. Furthermore, the indicators on the authentication sheets indicate the placement positions and orientations of the two authentication sheets.

Figure 8:
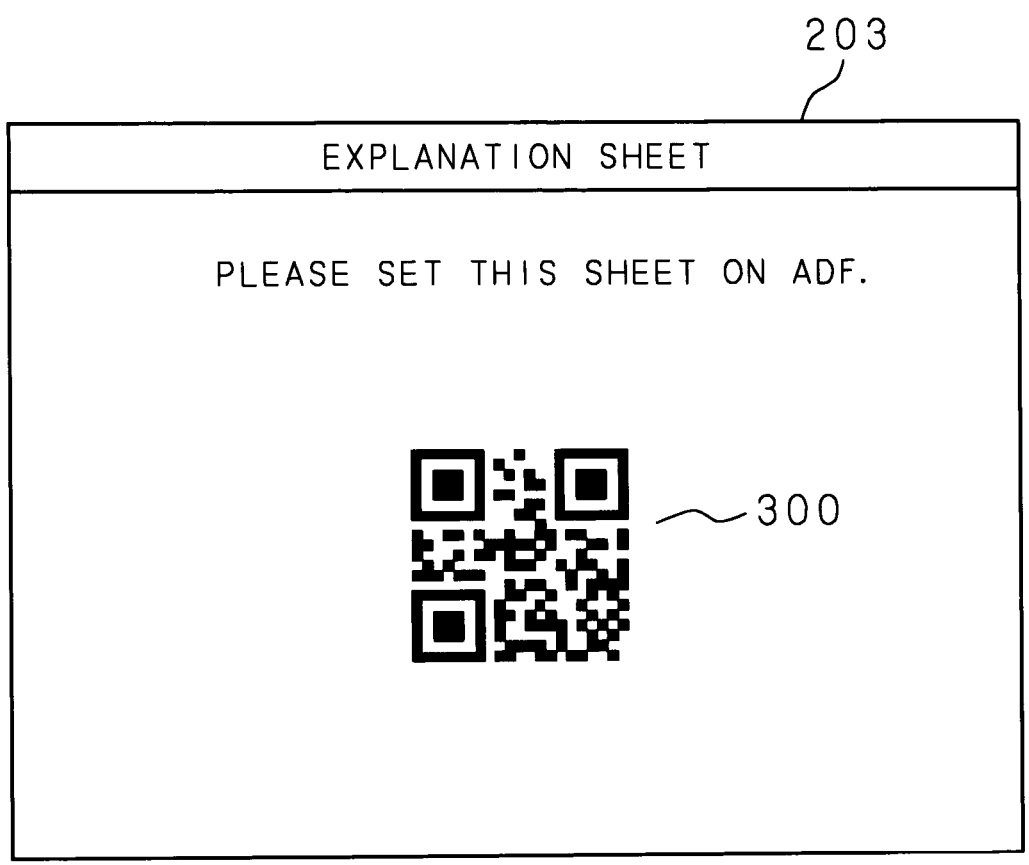
FIG. 8 is a schematic view showing still another example of an explanation sheet for authentication.

FIG. 8 is a schematic view showing still another example of an explanation sheet for authentication. The explanation sheet 203 shown in FIG. 8 shows the content of the explanation sheet 201 shown in FIG. 6 using a QR code 300 by encrypting the content (so that the content cannot be recognized from the appearance). Hence, the combination information of the authentication sheets is encrypted so that the information can be recognized using only the image reading apparatus 1. The QR code 300 on the explanation sheet 203 states that the two authentication sheets are overlaid in order, placed on the document reading section (ADF) 13 and then read. Furthermore, the indicators on the authentication sheets indicate the order of reading the two authentication sheets and the orientations of the two authentication sheets when the sheets are placed on the document reading section 13.

Figure 9:
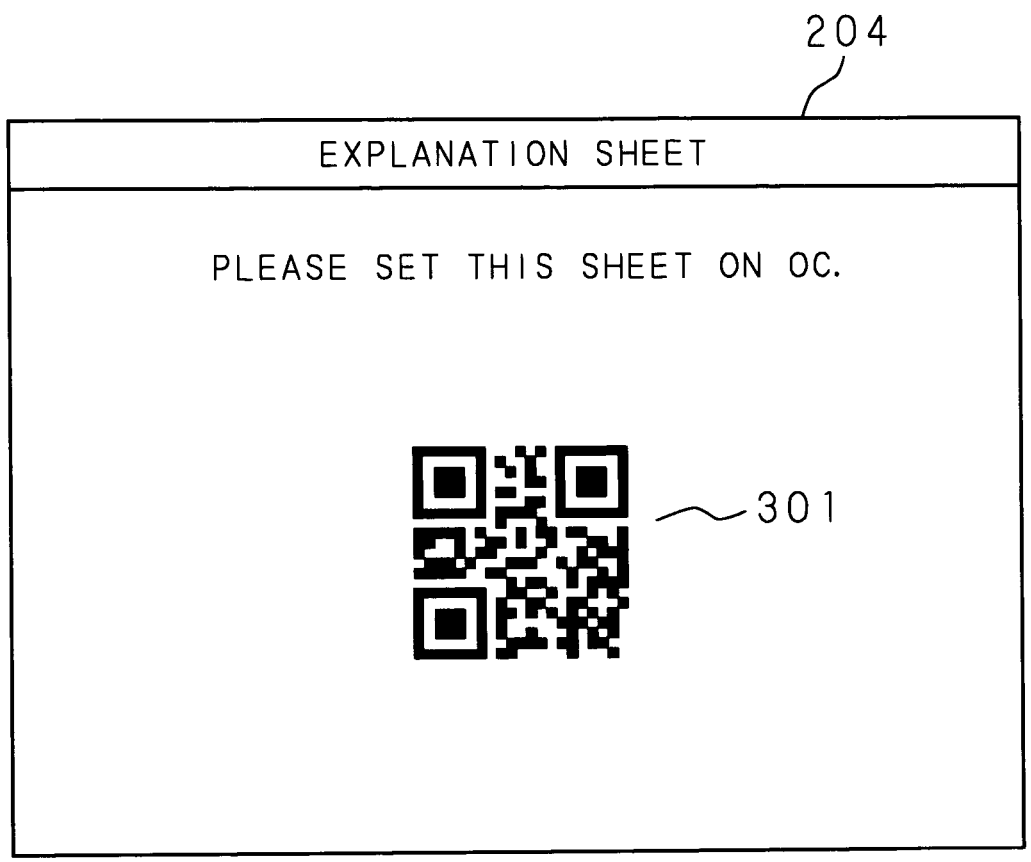
FIG. 9 is a schematic view showing yet sill another example of an explanation sheet for authentication.

FIG. 9 is a schematic view showing yet still another example of an explanation sheet for authentication. The explanation sheet 204 shown in FIG. 9 shows the content of the explanation sheet 202 shown in FIG. 7 using a QR code 301. Hence, the combination information of the authentication sheets is encrypted so that the information can be recognized using only the image reading apparatus 1. The QR code 301 on the explanation sheet 204 states that the two authentication sheets are placed on the plate of the image input section (OC) 12 and then read. Furthermore, the indicators on the authentication sheets indicate the relative positions and orientations of the two authentication sheets when the sheets are placed on the plate.

FIG. 10 shows an example wherein QR codes are attached on authentication sheets for authentication. In the example shown in FIG. 10, two authentication sheets 101 and 102 are combined and used for authentication. A circular pattern 101a designed or colored appropriately and a QR code 302 are recorded on the front side of a first authentication sheet 101, and a square pattern 101b designed or colored appropriately and a QR code 303 are recorded on the back side of the first authentication sheet 101. Furthermore, a triangular pattern 102a designed or colored appropriately and a QR code 304 are recorded on the front side of a second authentication sheet 102, and a rectangular pattern 102b designed or colored appropriately and a QR code 305 are recorded on the back side of the second authentication sheet 102.

In this case, in each QR code, combination information including the order of reading, the placement positions and orientations of the respective authentication sheets is recorded. The QR code, that is, the combination information, is not required to be recorded on both the front and back sides of each authentication sheet, but may be recorded on the front or back side of one of authentication sheets being used for combination.

On the basis of a plurality of the patterns and the combination information output from the pattern recognition section 14, the authentication section 16 judges whether the combination of a plurality of the patterns having been output (for example, the order, placement positions and orientations of a plurality of the patterns) coincides with the combination information having been output. A pattern matching method or the like can be used for the coincidence between the combination of a plurality of the patterns and the combination information.

In the case that it is judged that the combination of a plurality of the patterns coincides with the combination information, the authentication section 16 gains access to an authentication table 161, and judges whether the user code corresponding to the combination of the patterns being coincident has been recorded or not. In the case that the corresponding user code has been recorded, the user is authenticated.

FIG. 11 is a conceptual view showing the content of the authentication table 161. In the authentication table 161, the user code of each user and the combination of patterns are stored so as to correspond to each other. For example, the combination of circular, square, triangular and rectangular patterns (each designed or colored appropriately) is stored so as to correspond to a user code "0001".

The content of the authentication table 161 can be registered, renewed or deleted using the external personal computer (PC) 3 or the like via the user interface section 19 or the communication section 11. Anything, such as the name, company member number, password or personal identification number of each user, can be used as the user code, provided that the user can be identified. In addition, the combination of patterns is not limited to that shown in FIG. 11. For example, the combination of patterns may be information indicating the features of graphic forms, instead of the actual graphic forms of patterns, or may also be graphic data, characters, numerals or symbols.

On the basis of a plurality of the patterns and the combination information output from the pattern recognition section 14, the setting section 17 judges whether the combination of a plurality of the patterns having been output (for example, the order, placement positions and orientations of a plurality of the patterns) coincides with the combination information having been output. A pattern matching method or the like can be used for the coincidence between the combination of a plurality of the patterns and the combination information.

In the case that it is judged that the combination of a plurality of the patterns coincides with the combination information, the setting section 17 gains access to a setting table 171, and judges whether the function setting code corresponding to the combination of the patterns being coincident has been recorded or not. In the case that the corresponding function setting code has been recorded, the function is set.

FIG. 12 is a conceptual view showing the content of the setting table 171. In the setting table 171, the setting code for setting each function and the combination of patterns (more specifically, arrow-shaped indicators showing the orientations, the front/back sides and the page numbers of the authentication sheets on which the patterns have been recorded) have been stored so as to correspond to each other, in two different cases: in one case wherein sheets are placed on the ADF (document reading section 13), and in the other case wherein setting sheets (authentication sheets for setting) are placed on the OC (image input section 12). For example, in the case of placing the sheets on the ADF, the combination of a first authentication sheet being placed so that its solid-white arrow is oriented upward and a second authentication sheet being placed so that its designed or colored arrow is oriented downward is stored so as to correspond to a setting code "F0001". Furthermore, in the case of placing the sheets on the OC, the combination of a first authentication sheet being placed so that its solid-white arrow is oriented upward and a second authentication sheet being placed so that its designed or colored arrow is oriented downward while the two sheets are spaced therebetween is stored so as to correspond to the setting code "F0001." In the case of this setting code, the function to be set is a function for obtaining two copies. Similarly, in the case of a setting code "F0002," the function to be set is a function for image transmission (mail transmission after scanning).

The content of the setting table 171 can be registered, renewed or deleted using the external personal computer (PC) 3 or the like via the user interface section 19 or the communication section 11. The functions to be set are not limited to those described above, but they may include functions for setting darkness, contraction and expansion, monochrome or color, resolution, Nin1 during copying, and functions for setting staple, punch, scanner function, network scanner function, facsimile function, information source, destination, etc. In addition, the combination of patterns is not limited to that shown in FIG. 12. For example, the combination of patterns may be information indicating the features of graphic forms, instead of the actual graphic forms of patterns, or may also be graphic data, characters, numerals or symbols.

On the basis of a plurality of the patterns and the combination information output from the pattern recognition section 14, the restriction removing section 18 judges whether the combination of a plurality of the patterns having been output (for example, the order, placement positions and orientations of a plurality of the patterns) coincides with the combination information having been output. A pattern matching method or the like can be used for the coincidence between the combination of a plurality of the patterns and the combination information.

In the case that it is judged that the combination of a plurality of the patterns coincides with the combination information, the restriction removing section 18 gains access to a restriction removing table 181, and judges whether the function restriction removing code corresponding to the combination of patterns being coincident has been recorded or not. In the case that the corresponding function restriction removing code has been recorded, the restriction on the function is removed. The judgment results of the authentication section 16, the setting section 17 and the restriction removing section 18 are output to the control section 10.

FIG. 13 is a conceptual view showing the content of the restriction removing table 181. In the restriction removing table 181, the restriction removing code for removing the restriction on each function and the combination of patterns (more specifically, arrow-shaped indicators showing the orientations, the front/back sides and the page numbers of the authentication sheets on which the patterns have been recorded) have been stored so as to correspond to each other, in two different cases: in one case wherein sheets are placed on the ADF (document reading section 13), and in the other case wherein restriction removing sheets (authentication sheets for restriction removing) are placed on the OC (image input section 12). For example, in the case of placing the sheets on the ADF, the combination of a first authentication sheet being placed so that its designed or colored arrow is oriented upward and a second authentication sheet being placed so that its solid-white arrow is oriented downward is stored so as to correspond to a restriction removing code "C0001". Furthermore, in the case of placing the sheets on the OC, the combination of a first authentication sheet being placed so that its designed or colored arrow is oriented upward and a second authentication sheet being placed so that its solid-white arrow is oriented downward while the two sheets are spaced therebetween is stored so as to correspond to the setting code "C0001." In the case of this setting code, the function to be subjected to restriction removing is ADF or OC disabling. When the restriction on the function is removed, the ADF or OC is enabled. In other words, in the case that the authentication sheets are read using the ADF, the OC can be used. In the case that the authentication sheets are read using the OC, the ADF can be used. Furthermore, similarly, in the case that the restriction removing code is "C0002", the function to be subjected to restriction removing is the upper limit of the number of copies at the ADF.

The content of the restriction removing table 181 can be registered, renewed or deleted using the external personal computer (PC) 3 or the like via the user interface section 19 or the communication section 11. The functions to be subjected to restriction removing are not limited to those described above, but they may include the removing of color copying restriction, the removing of restriction on printing stored data (hold print function), etc. In addition, the combination of patterns is not limited to that shown in FIG. 13. For example, the combination of patterns may be information indicating the features of graphic forms, instead of the actual graphic forms of patterns, or may also be graphic data, characters, numerals or symbols.

The control section 20 of the image forming apparatus 2 has a ROM in which a control program indicating the control procedure thereof is stored beforehand, and also has a RAM in which data being created during the execution of the control program is stored. The CPU of the control section 20 loads the control program stored in the ROM into the RAM, and the control section 20 thus controls the operation of the image forming apparatus 2 according to the control procedure indicated in the control program.

The communication section 23 has a network interface for communicating with the personal computer (PC) 3 or the image reading apparatus 1, a facsimile communication interface for facsimile communicating with an external facsimile machine, etc. The communication section 23 receives print jobs transmitted from the image reading apparatus 1 or an external device, such as the personal computer (PC) 3 and transmits information to the external device.

The storage section 22 is formed of an HDD unit, for example, and stores data received via the communication section 23.

The user interface section 24 is a touch-panel type operation panel, and has an operation section for receiving operation instructions from the user, and a liquid crystal display device for displaying information to be transmitted to the user.

The image forming section 21 forms images on sheets on the basis of data transmitted from the image reading apparatus 1 or the personal computer (PC) 3 and received via the communication section 23 or on the basis of data stored in the storage section 22. The image forming section 21 comprises a photoconductive drum, a charger for charging the photoconductive drum to a predetermined potential, a laser writer for forming electrostatic latent images on the surface of the photoconductive drum, a developer for making the electrostatic latent images on the surface of the photoconductive drum visible by supplying toner thereto, a transfer unit for transferring the toner images on the surface of the photoconductive drum to sheets, etc. The system used for the image forming section 21 is not limited to the electrophotographic system, but may be the ink jet system, the thermal transfer system or the like.

The image forming apparatus 2 carries out printing on sheets for authentication (authentication sheets for user authentication, setting sheets, restriction removing sheets, explanation sheets, etc.) under the control of the control section 20.

Figure 14:
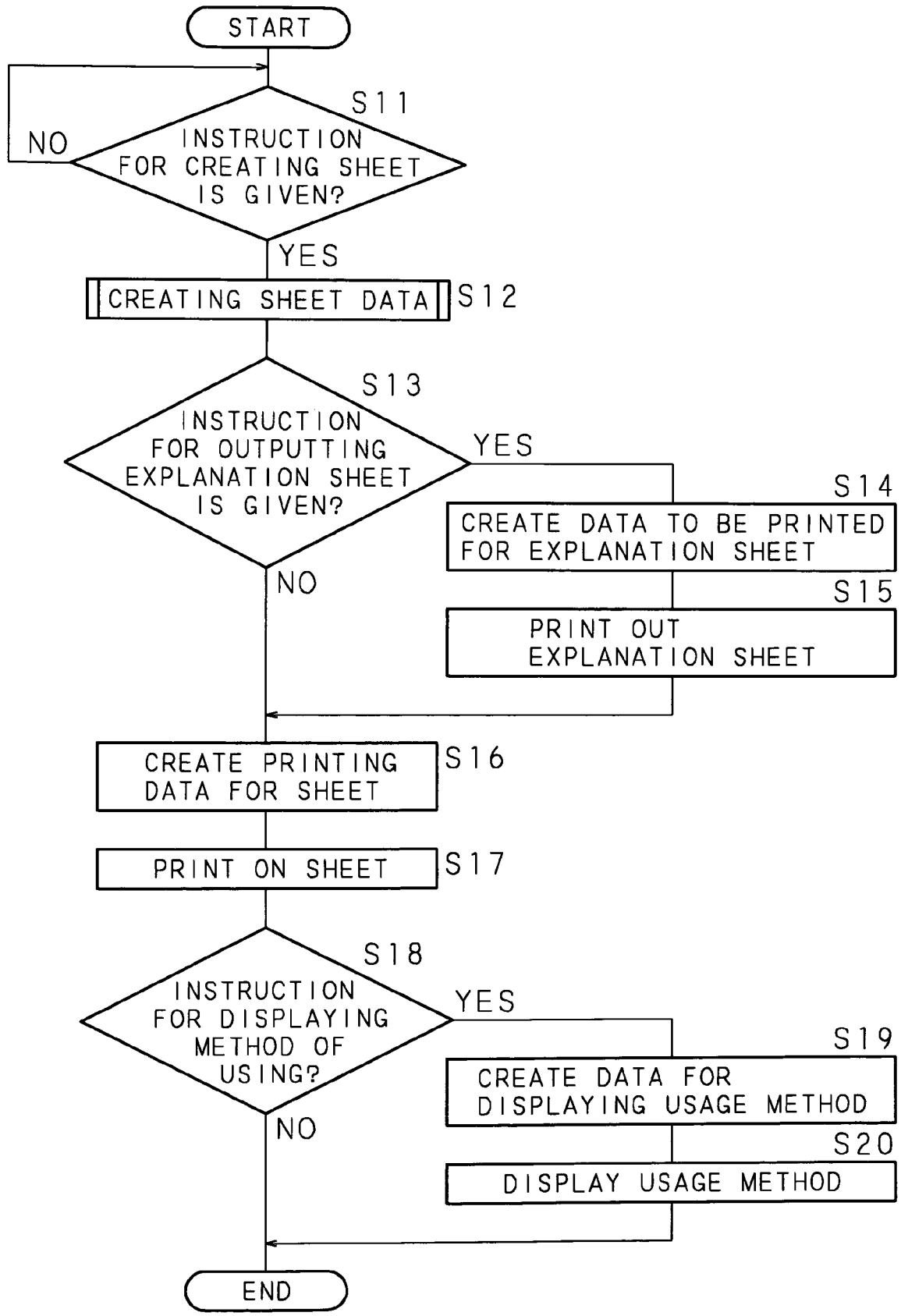
FIG. 14 is a flowchart showing the procedure for the processing carried out by the image forming apparatus in the case that a sheet for authentication is formed.
Figure 15:
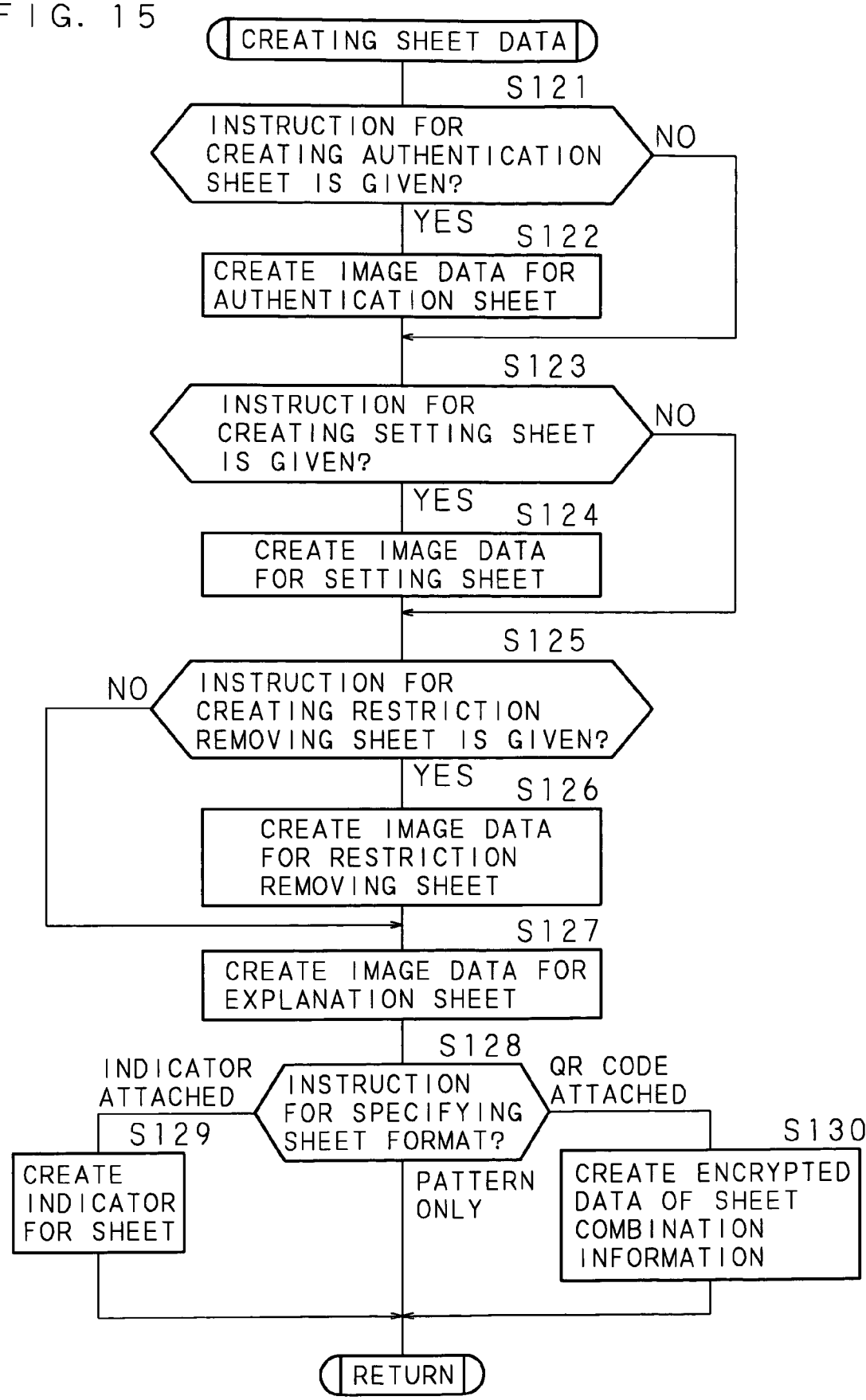
FIG. 15 is a flowchart showing the procedure for the processing carried out by the image forming apparatus in the case that a sheet for authentication is formed.

Next, the operation of the image forming apparatus 2 according to the present invention will be described below. FIGS. 14 and 15 are flowcharts showing the procedure of the processing carried out by the image forming apparatus 2 in the case that a sheet for authentication is created. On the basis of the information input from the user interface section 24 or the communication section 23, the control section 20 judges whether an instruction for creating a sheet for authentication is given or not (at step S11). In the case that the instruction for creating a sheet for authentication is not given (NO at step S11), the control section 20 carries out the process of step S11 continuously, thereby standing by until the instruction for creating a sheet for authentication is given.

When the instruction for creating a sheet for authentication is given (YES at step S11), the control section 20 carries out the process for creating sheet data (at step S12). On the basis of the information input from the user interface section 24 or the communication section 23, the control section 20 judges whether an instruction for outputting an explanation sheet is given or not (at step S13). In the case that the instruction for outputting an explanation sheet is given (YES at step S13), the control section 20 creates data to be printed for the explanation sheet (at step S14) on the basis of the data stored in the storage section 22 or the data received via the communication section 23.

The control section 20 executes printing out the explanation sheet (at step S15), and creates printing data for the sheet that is instructed to be created (at step S16). In the case that the instruction for outputting an explanation sheet is not given (NO at step S13), the control section 20 carries out the process of step S16. Furthermore, the control section 20 carries out printing on the sheet that is instructed to be created (at step S17), and judges whether an instruction for displaying the method of using the sheet for authentication is given or not (at step S18).

In the case that the instruction for displaying the method of using the sheet for authentication is given (YES at step S18), the control section 20 creates data for displaying the usage method (at step S19) and displays the usage method on the user interface section 24 or the like (at step S20), and the control section 20 ends the processing.

Next, the processing for creating sheet data at step S12 will be described below. On the basis of the information input from the user interface section 24 or the communication section 23, the control section 20 judges whether an instruction for creating an authentication sheet for user authentication is given or not (at step S121). In the case that the instruction for creating an authentication sheet is given (YES at step S121), the control section 20 creates image data for the authentication sheet (at step S122), and judges whether an instruction for creating a setting sheet is given or not (at step S123).

In the case that the instruction for creating an authentication sheet is not given (NO at step S121), the control section 20 carries out the process of step S123. In the case that the instruction for creating a setting sheet is given (YES at step S123), the control section 20 creates image data for the setting sheet (at step S124), and judges whether an instruction for creating a restriction removing sheet is given or not (at step S125). In the case that the instruction for creating a setting sheet is not given (NO at step S123), the control section 20 carries out the process of step S125.

In the case that the instruction for creating a restriction removing sheet is given (YES at step S125), the control section 20 creates image data for the restriction removing sheet (at step S126), and creates image data for the explanation sheet (at step S127). The control section 20 judges an instruction for specifying the sheet format for authentication (at step S128). In the case that the instruction for creating a restriction removing sheet is not given (at step S125), the control section 20 carries out the process of step S127.

In the case that the instructed format has an indicator (the format having an indicator at step S128), the control section 20 creates indicator data for the sheet (at step S129), and ends the processing for creating sheet data. In the case that the instructed format has a QR code (the format having a QR code at step S128), the control section 20 creates data for the QR code wherein sheet combination information is encrypted (at step S130), and ends the processing for creating sheet data. In the case that the instructed format has only a pattern (the format having only a pattern at step S128), the control section 20 ends the processing for creating sheet data.

Figure 16:
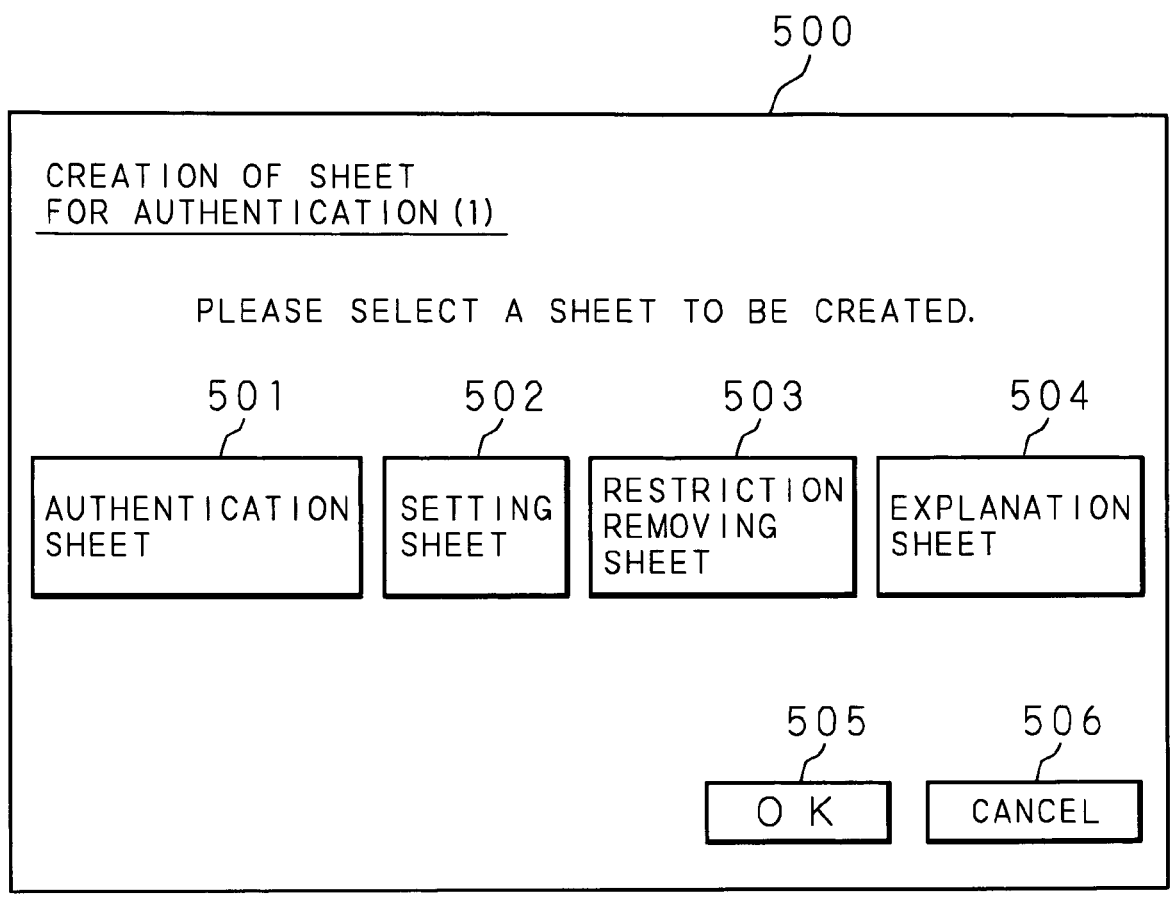
FIG. 16 is a schematic view showing an example of a display appearing on the display screen of a user interface section or an external device.

FIGS. 16 to 19 are schematic views showing examples of displays appearing on the display screen of the user interface section 24 or an external device. FIG. 16 shows an example of a creation display 500 appearing in the case that a sheet for authentication is created. At the central portion of the creation display 500, an authentication sheet button 501, a setting sheet button 502, a restriction removing sheet button 503 and an explanation sheet button 504 are provided to select a sheet to be created (an authentication sheet for user authentication, a setting sheet, a restriction removing sheet or an explanation sheet). Furthermore, at the lower side, an OK button 505 for executing a creation process and a cancel button 506 for canceling the creation process are provided. Hence, the user can select and create a sheet for authentication.

Figure 17:
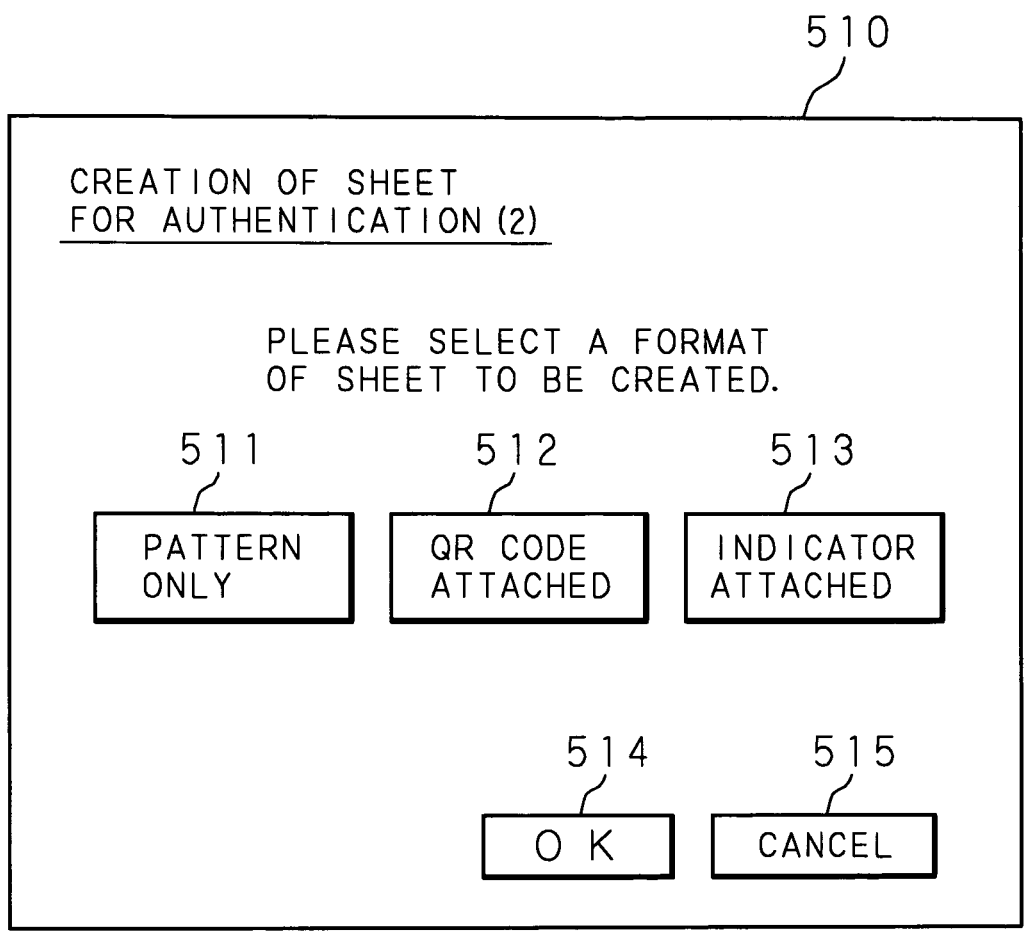
FIG. 17 is a schematic view showing an example of a display appearing on the display screen of the user interface section or the external device.

FIG. 17 shows an example of a creation display 510 appearing in the case that a sheet for authentication is created. At the central portion of the creation display 510, a pattern-only format button 511, a QR-code-attached format button 512 and an indicator-attached format button 513 are provided to select the format of the sheet to be created. Furthermore, at the lower side, an OK button 514 for executing a format selection process and a cancel button 515 for canceling the format selection process are provided. Hence, the user can select a format wherein only a pattern is recorded, a format wherein a QR code is recorded, or a format wherein an indicator is recorded on the sheet for authentication.

Figure 18:
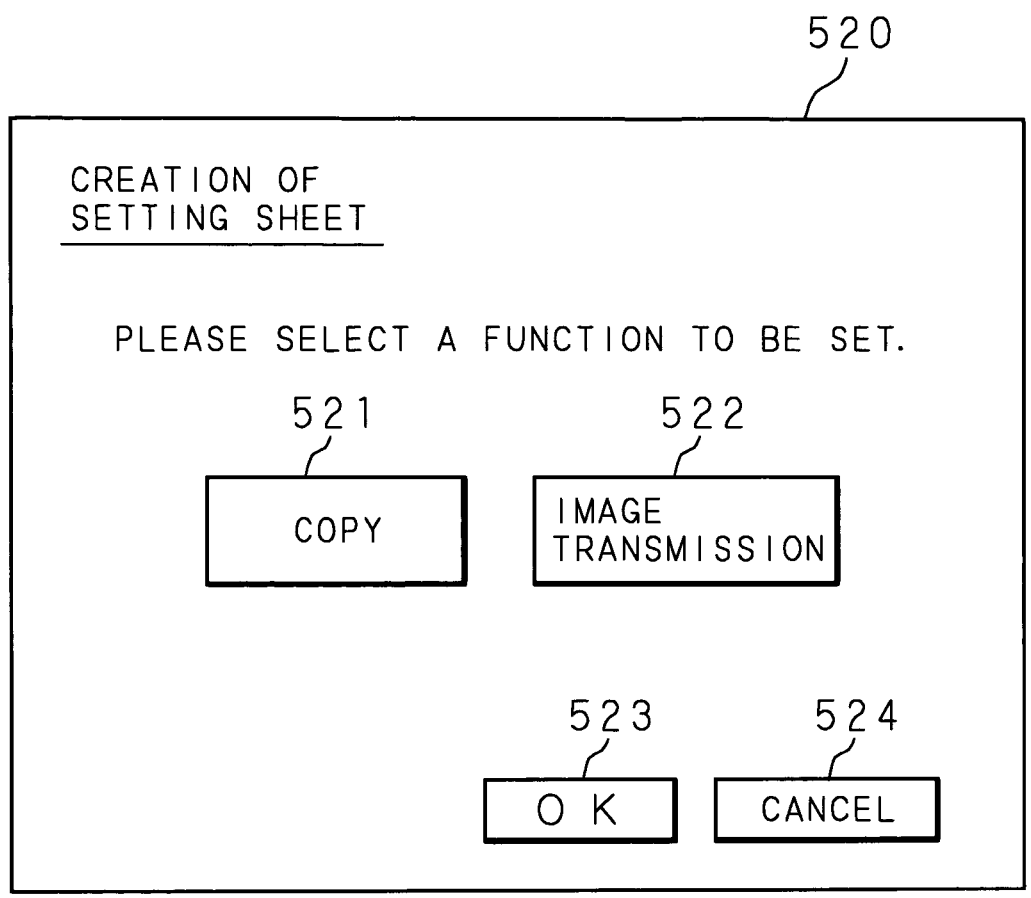
FIG. 18 is a schematic view showing an example of a display appearing on the display screen of the user interface section or the external device.

FIG. 18 shows an example of a creation display 520 appearing in the case that a setting sheet is created. At the central portion of the creation display 520, a copy button 521 and an image transmission button 522 are provided to select a function to be set. Furthermore, at the lower side, an OK button 523 for executing a setting process and a cancel button 524 for canceling the setting process are provided. Hence, the user can set a copy function or an image transmission function.

Figure 19:
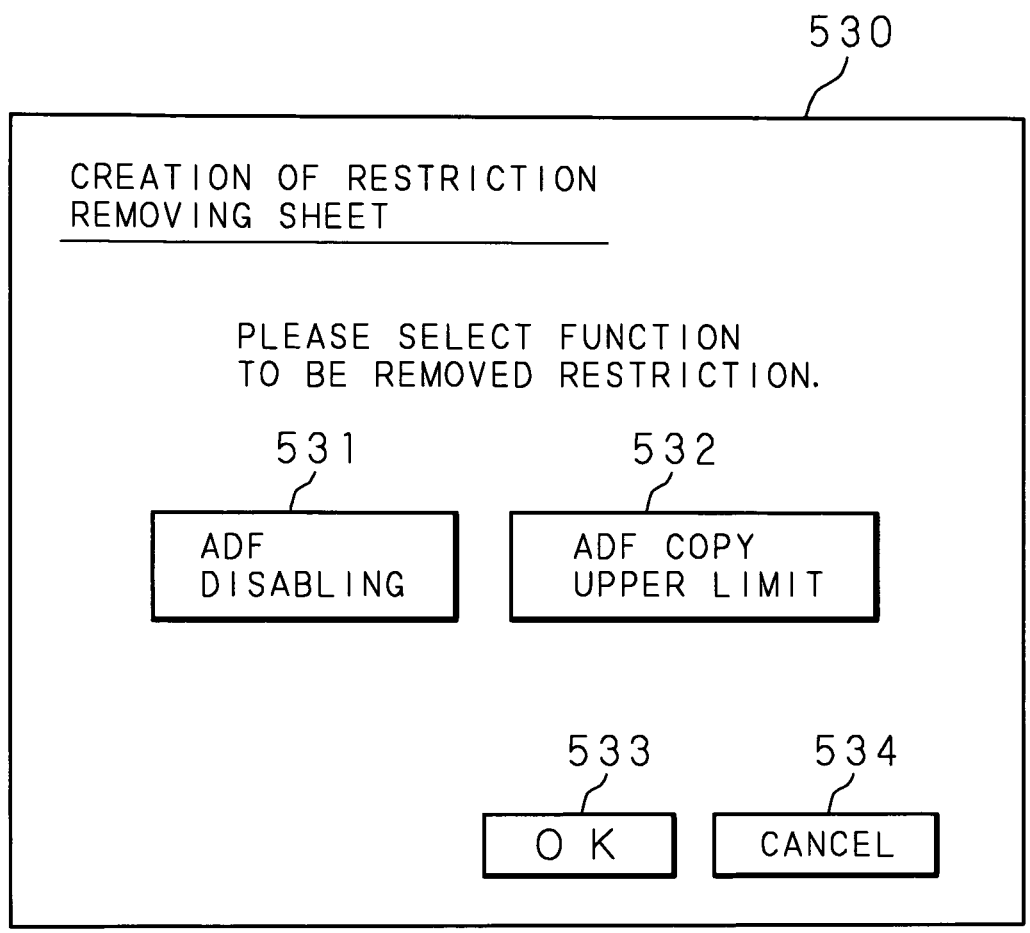
FIG. 19 is a schematic view showing an example of a display appearing on the display screen of the user interface section or the external device.

FIG. 19 shows an example of a creation display 530 appearing in the case that a restriction removing sheet is created. At the central portion of the creation display 530, an ADF disabling button 531 and an ADF copy upper-limit button 532 are provided to, select a function whose restriction is removed. Furthermore, at the lower side, an OK button 523 for executing a restriction removing process and a cancel button 524 for canceling the restriction removing process are provided. Hence, the user can remove the ADF disabling function or the ADF copy upper-limit function.

Figure 20:
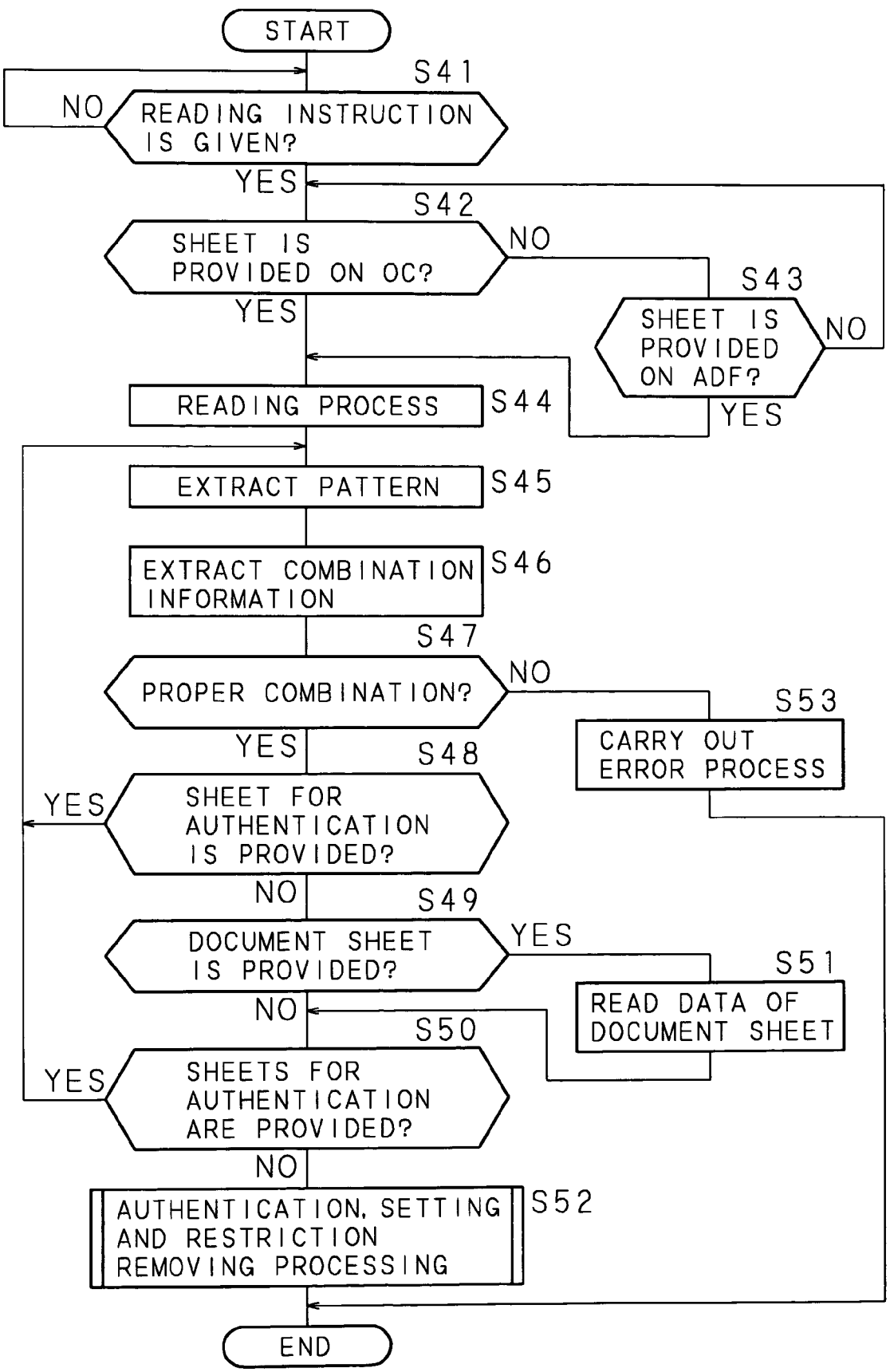
FIG. 20 is a flowchart showing the procedure of the authentication processing carried out by the image reading apparatus using an OC or an ADF.
Figure 21:
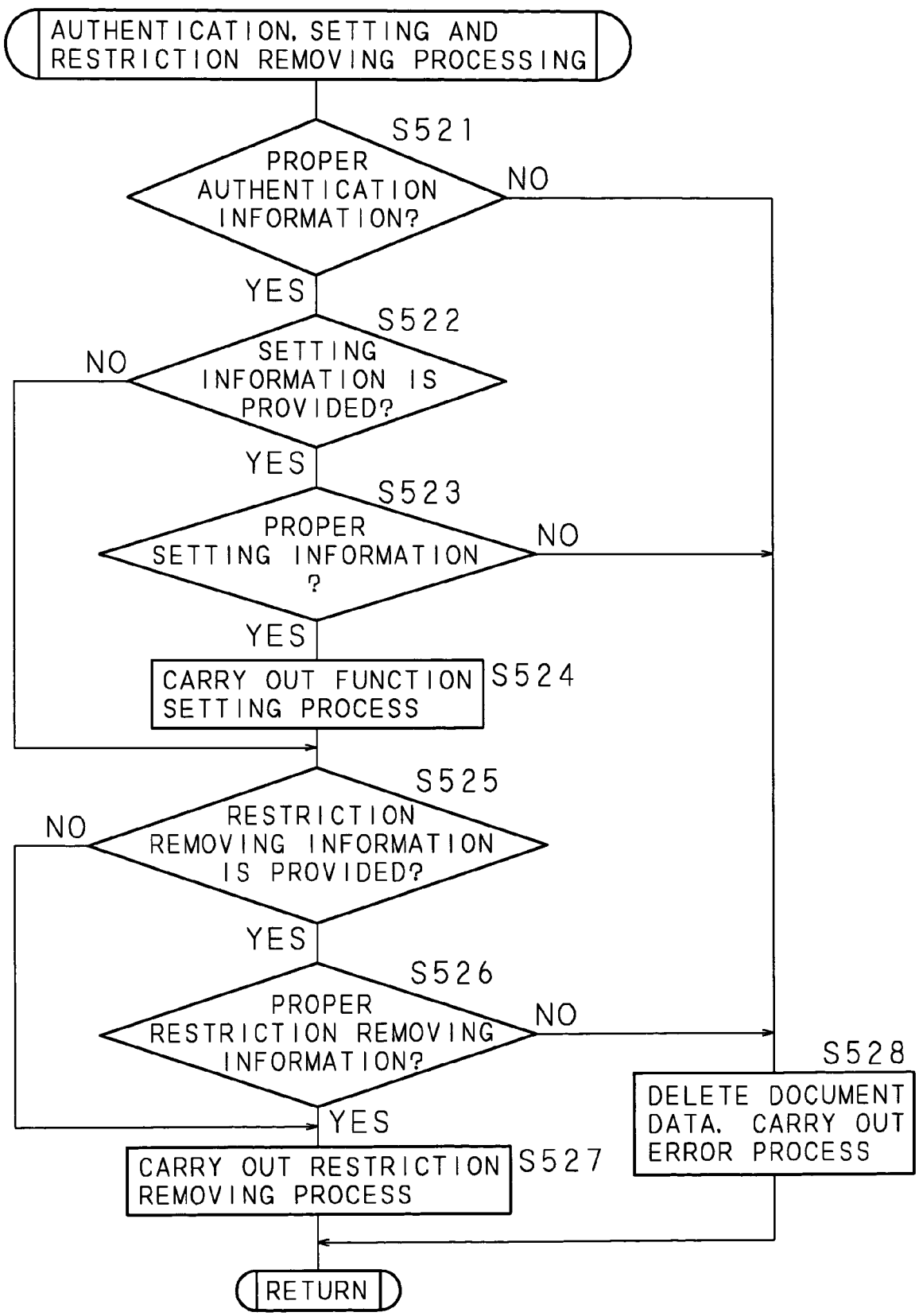
FIG. 21 is a flowchart showing the procedure of the authentication processing carried out by the image reading apparatus using the OC or the ADF.

Next, the operation of the image reading apparatus 1 according to the present invention will be described below. FIGS. 20 and 21 are flowcharts showing the procedure of the authentication processing carried out by the image reading apparatus 1 using an OC or an ADF. On the basis of the information input from the user interface section 19 or the communication section 11, the control section 10 judges whether a reading instruction is given or not (at step S41). In the case that the reading instruction is not given (NO at step S41), the control section 10 carries out the process of step S41 continuously, thereby standing by until the reading instruction is given.

In the case that the reading instruction is given (YES at step S41), the control section 10 judges whether a sheet is provided on the OC or not (at step S42). In the case that no sheet is provided on the OC (NO at step S42), the control section 10 judges whether a sheet is provided on the ADF or not (at step S43). In the case that no sheet is provided on the ADF (NO at step S43), the control section 10 carries out the process of step S42 continuously, thereby standing by until a sheet is set on the OC or the ADF.

In the case that a sheet is provided on the OC (YES at step S42) or a sheet is provided on the ADF (YES at step S43), the control section 10 carries out a reading process (at step S44). The pattern recognition section 14 extracts a pattern from the sheet having been read (at step S45), and also extracts the combination information regarding the combination of a plurality of patterns (the usage methods for an authentication sheet, a setting sheet and a restriction removing sheet; that is, the content of an explanation sheet) (at step S46).

On the basis of the result of the extraction in the pattern recognition section 14, the control section 10 judges whether the combination is proper or not for each sheet having been read (whether the combination of patterns coincides with the combination information or not) (at step S47). In the case that the control section 10 judges that the combination is proper (YES at step S47), the control section 10 judges whether a sheet for authentication is provided or not (at step S48). In the case that the control section 10 judges that the combination is not proper (NO at step S47), the control section 10 carries out an error process, such as error display (at step S53), and ends the processing. Hence, the image reading apparatus 1 stops operation even in the middle of the reading process and does not carry out subsequent processing.

In the case that the control section 10 judges that a sheet for authentication is provided (YES at step S48), the control section 10 carries out the process of step S45. In the case that the control section 10 judges that no sheet for authentication is provided (NO at step S48), the control section 10 judges whether document sheets are provided or not (at step S49). Hence, in the case that document sheets are set so as to be overlaid on sheets for authentication, these sheets can be read continuously.

In the case that the control section 10 judges that document sheets are provided (YES at step S49), the control section 10 reads the data of the document sheets (at step S51), and judges whether sheets for authentication are provided or not (at step S50). Hence, in the case that document sheets are set so as to be held between sheets for authentication, these sheets can be read continuously. In the case that the control section 10 judges that document sheets are not provided (NO at step S49), the control section 10 carries out the process of step S50. In the case that the control section 10 judges that sheets for authentication are provided (YES at step S50), the control section 10 carries out the process of step S45. In the case that the control section 10 judges that sheet for authentication are not provided (NO at step S50), the control section 10 carries out authentication, setting and restriction removing processing (at step S52), and ends the processing.

Next, the authentication, setting and restriction removing processing will be described below. In the case that the combination of a plurality of patterns extracted from the images on all the sheets having been read coincides with the combination information, the control section 10 controls the authentication section 16 to judge whether the combination being coincident is proper authentication information (coincides with the combination of patterns stored on the authentication table 161) or not (at step S521). In the case that the control section 10 judges that the combination is proper authentication information (YES at step S521), the control section 10 judges that the user authentication is obtained, and controls the setting section 17 to judge whether setting information (pattern combination for function setting) is provided or not (at step S522).

In the case that the control section 10 judges that the setting information is provided (YES at step S522), the control section 10 judges whether the combination being coincident is proper setting information (coincides with the combination of patterns stored on the setting table 171) or not (at step S523). In the case that the control section 10 judges that the combination is proper setting information (YES at step S523), the control section 10 carries out the function setting process (at step S524).

The control section 10 controls the restriction removing section 18 to judge whether restriction removing information (the combination of patterns for function restriction removing) is provided or not (at step S525). In the case that the control section 10 judges that the restriction removing information is provided (YES at step S525), the control section 10 judges whether the combination being coincident is proper restriction removing information (coincides with the combination of patterns stored on the restriction removing table 181) or not (at step S526). In the case that the control section 10 judges that the combination is proper restriction removing information (YES at step S526), the control section 10 carries out the function restriction removing process (at step S527), and ends the processing.

In the case that the control section 10 judges that the setting information is not provided (NO at step S522), the control section 10 carries out the process of step S525 and the following processes continuously. Furthermore, in the case that the control section 10 judges that the restriction removing information is not provided (NO at step S525), the control section 10 carries out the process of step S527 continuously. Moreover, in the case that the control section 10 judges that the combination is not proper authentication information (NO at step S521), in the case that the control section 10 judges that the combination is not proper setting information (NO at step S523), or in the case that the control section 10 judges that the combination is not proper restriction removing information (NO at step S526), the control section 10 deletes document data having been read, and carries out an error process, such as error display (at step S528), and ends the authentication, setting and restriction removing processing.

Figure 22:
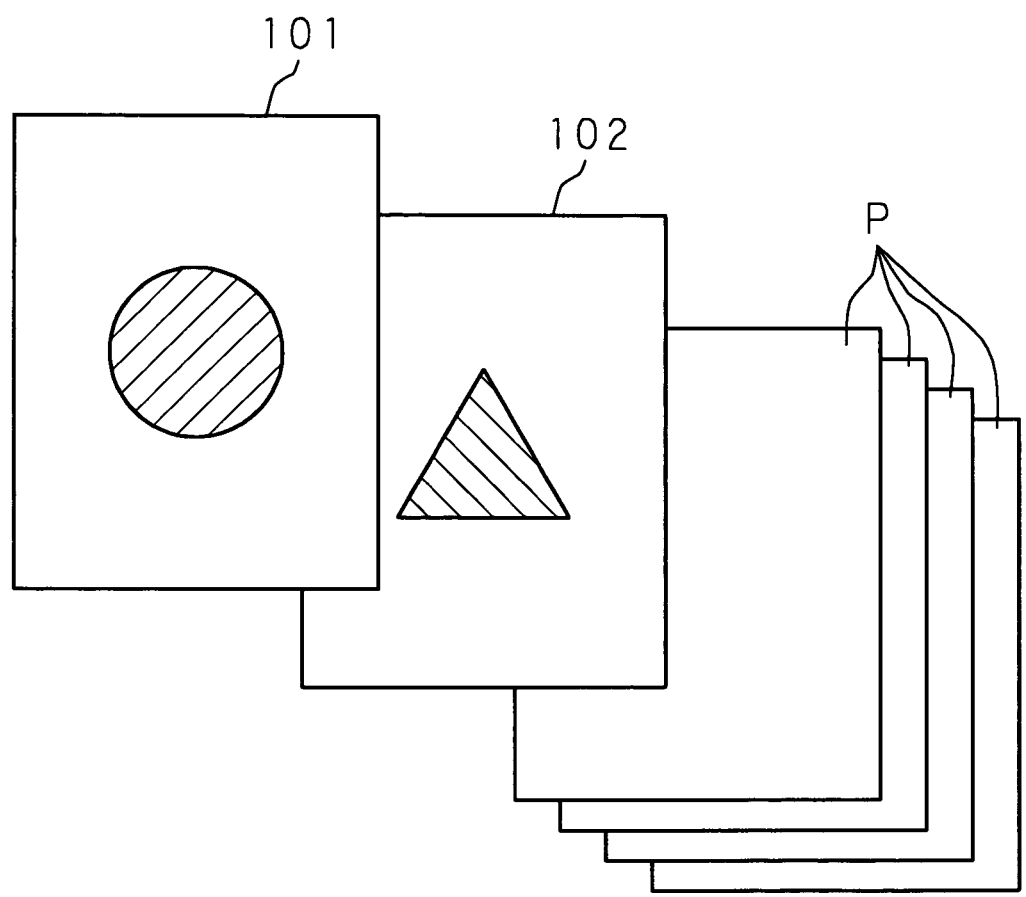
FIG. 22 is a schematic view showing an example of an overlay of authentication sheets and document sheets.
Figure 23:
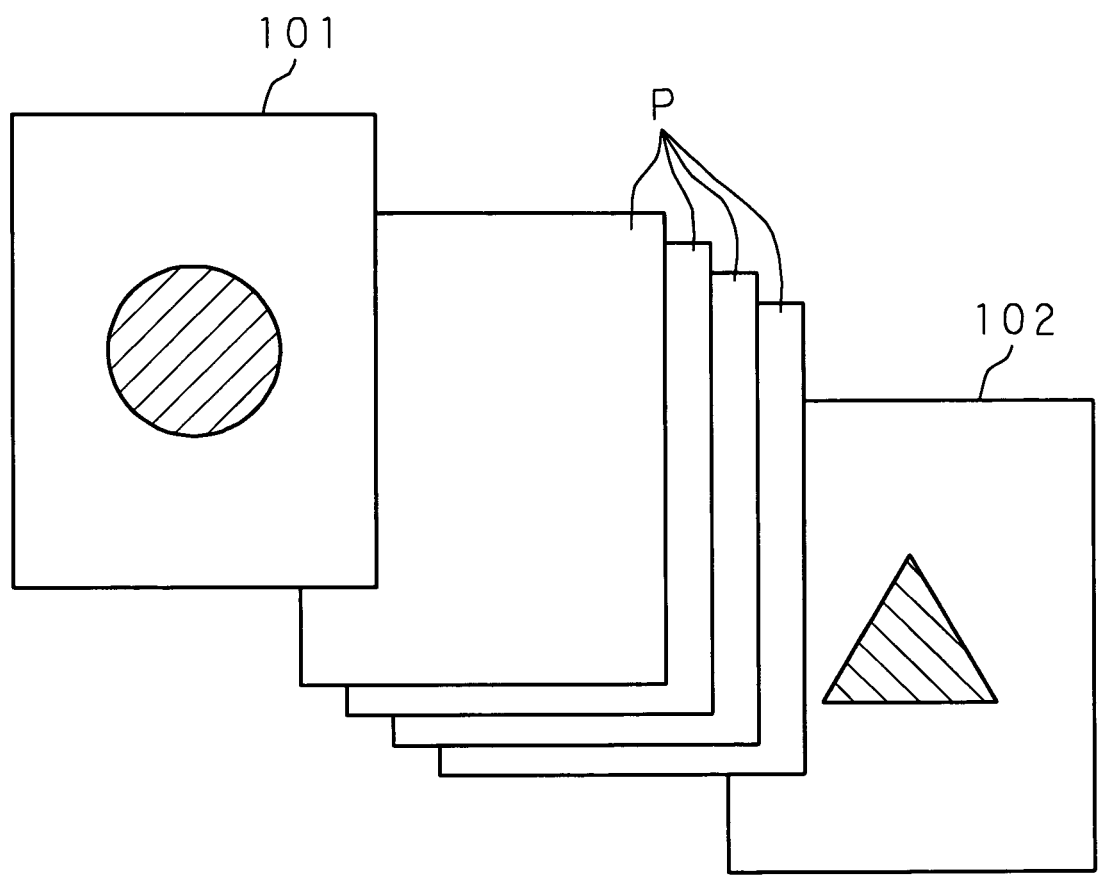
FIG. 23 is a schematic view showing another example of an overlay of authentication sheets and document sheets.

FIGS. 22 and 23 are schematic views showing examples of overlays of authentication sheets and document sheets. FIG. 22 shows an example wherein two authentication sheets 101 and 102 on which patterns are recorded are overlaid, and document sheets P, . . . are overlaid further. In addition, FIG. 23 shows an example wherein the document sheets P, . . . are overlaid so as to be held between the authentication sheets 101 and 102. The authentication sheets 101 and 102 may be an authentication sheet for user authentication, an explanation sheet, a setting sheet or a restriction removing sheet, or may be a combination of these. Although two authentication sheets are used in FIGS. 22 and 23, the number of the sheets is not limited to two. For example, it may also be possible to use a combination consisting of an explanation sheet as a first sheet, an authentication sheet for user authentication as a second sheet, setting sheets as third and fourth sheets, and restriction removing sheets as fifth and sixth sheets. Furthermore, in the case that the content (for example, pattern combination information) of an explanation sheet is recorded in an authentication sheet, a setting sheet or a restriction removing sheet using a QR code or the like, it is not necessary to overlay the explanation sheet together therewith. Moreover, it is also possible that the content of the explanation sheet is described on only the first authentication sheet using a QR code or the like so that the combination information of overlaid a plurality of authentication sheets is described using the QR code.

Figure 24:
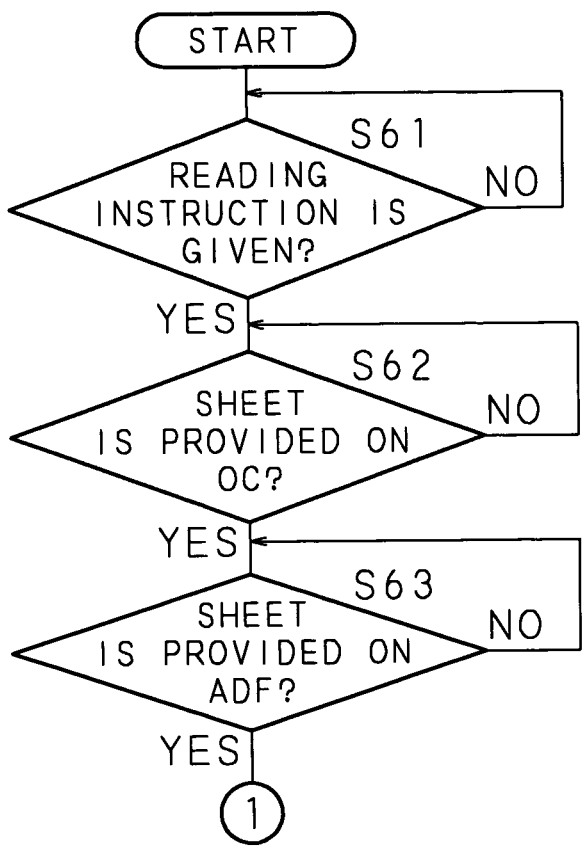
FIG. 24 is a flowchart showing the procedure of the authentication processing carried out by the image reading apparatus using an OC and an ADF simultaneously.
Figure 25:
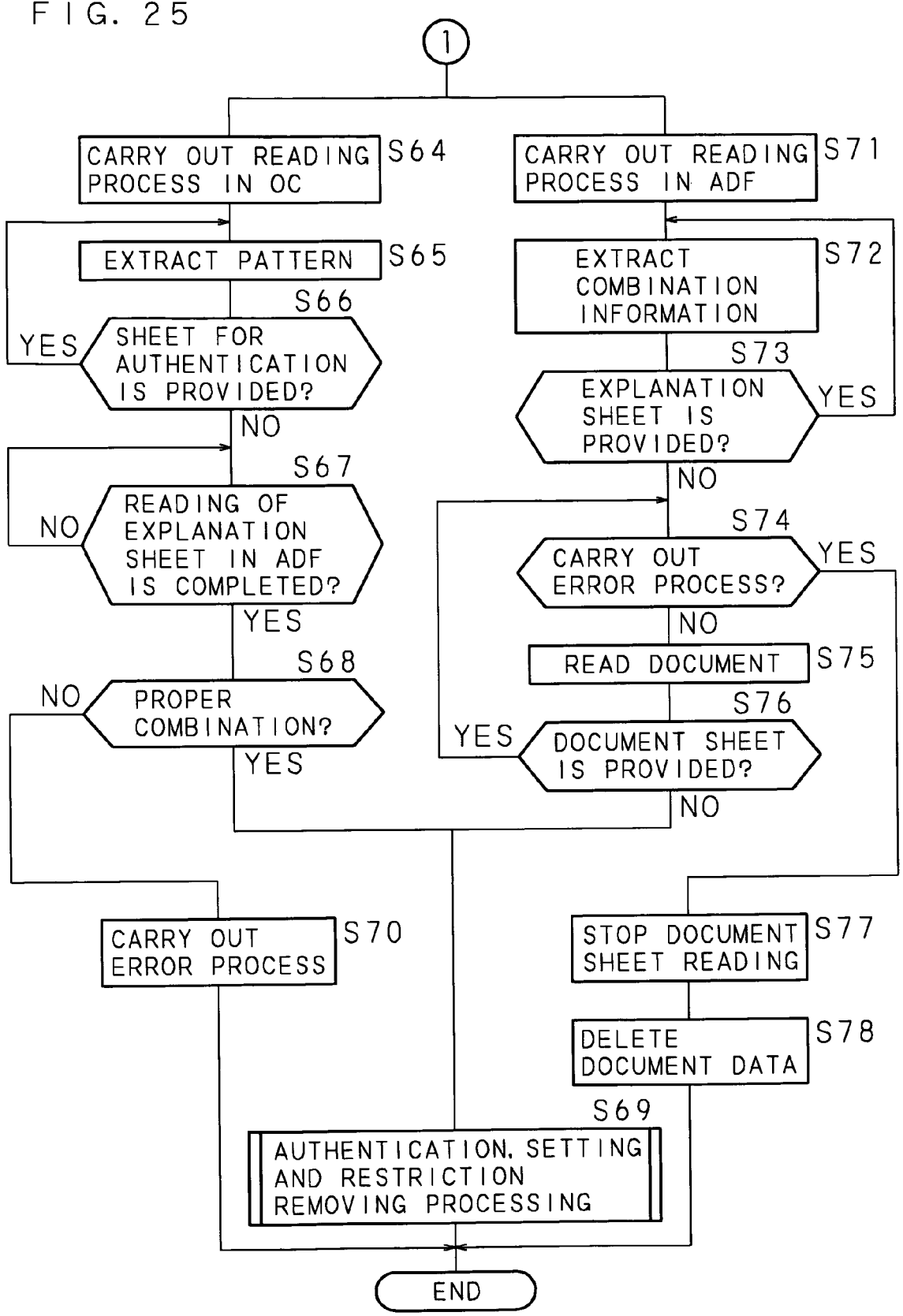
FIG. 25 is a flowchart showing the procedure of the authentication processing carried out by the image reading apparatus using the OC and the ADF simultaneously.

FIGS. 24 and 25 are flowcharts showing the procedure of the authentication processing carried out by the image reading apparatus 1 using an OC and an ADF simultaneously. FIGS. 24 and 25 show a case wherein an authentication sheet, a setting sheet or a restriction removing sheet is set on the OC and an explanation sheet and document sheets are set on the ADF. However, the setting of sheets is not limited to this case. On the basis of the information input from the user interface section 19 or the communication section 11, the control section 10 judges whether a reading instruction is given or not (at step S61). In the case that the reading instruction is not given (NO at step S61), the control section 10 carries out the process of step S61 continuously, thereby standing by until the reading instruction is given.

In the case that the reading instruction is given (YES at step S61), the control section 10 judges whether a sheet is provided on the OC or not (at step S62). In the case that no sheet is provided on the OC (NO at step S62), the control section 10 carries out the process of step S62 continuously, thereby standing by until a sheet is set on the OC.

In the case that a sheet is provided on the OC (YES at step S62), the control section 10 judges whether a sheet is provided on the ADF or not (at step S63). In the case that no sheet is provided on the ADF (NO at step S63), the control section 10 carries out the process of step S63 continuously, thereby standing by until a sheet is set on the ADF. Hence, the control section 10 stands by until a sheet is set on each of the OC and the ADF.

In the case that a sheet is provided on the ADF (YES at step S63), the control section 10 carries out a reading process in the OC (at step S64) and a reading process in the ADF (at step S71) in parallel. For the sake of convenience, the reading process in the OC will be described and then the reading process in the ADF will be described next. However, the process of step S64 and the following processes and the process of step S71 and the following processes are carried out in parallel.

After the reading process is carried out in the OC at step S64, the pattern recognition section 14 extracts a pattern from the sheet having been read (at step S65). The control section 10 judges whether a sheet for authentication is provided or not (at step S66). In the case that the control section 10 judges that a sheet for authentication is provided (YES at step S66), the control section 10 carries out the process of step S65 continuously.

In the case that the control section 10 judges that no sheet for authentication is provided (NO at step S66), the control section 10 judges whether the reading of an explanation sheet in the ADF is completed or not (at step S67). In the case that the reading of the explanation sheet in the ADF is not completed (NO at step S67), the control section 10 carries out the process of step S67 continuously, thereby standing by until the reading of the explanation sheet in the ADF is completed.

In the case that the reading of the explanation sheet in the ADF is completed (YES at step S67), on the basis of the result of the extraction in the pattern recognition section 14, the control section 10 judges whether the combination is proper or not for each sheet having been read (whether the combination of patterns coincides with the combination information or not) (at step S68). In the case that the control section 10 judges that the combination is proper (YES at step S68), the control section 10 carries out authentication, setting and restriction removing processing (at step S69), and ends the processing. Because the authentication, setting and restriction removing processing (at step S69) is the same as the authentication, setting and restriction removing processing (at step S52) shown in FIG. 20, the explanation of the processing is omitted.

In the case that the control section 10 judges that the combination is not proper (NO at step S68), the control section 10 carries out an error process, such as error display (at step S70), and ends the processing.

On the other hand, after the reading process is carried out in the ADF at step S71, the pattern recognition section 14 extracts the combination information (the usage methods for an authentication sheet, a setting sheet and a restriction removing sheet) from the sheet having been read (at step S72). The control section 10 judges whether an explanation sheet is provided or not (at step S73). In the case that the control section 10 judges that an explanation sheet is provided (YES at step S73), the control section 10 carries out the process of step S72 continuously. In the case that the control section 10 judges that no explanation sheet is provided (NO at step S73), the control section 10 judges whether an error process is carried out or not (at step S74).

In the case that no error process is carried out (NO at step S74), the control section 10 reads a document (at step S75), and judges whether a document sheet is provided or not (at step S76). In the case that the control section 10 judges that a document sheet is provided (YES at step S76), the control section 10 carries out the process of step S74 and the following processes continuously. In the case that the control section 10 judges that no document sheet is provided (NO at step S76), the control section 10 carries out the process of step S69 and the following steps continuously.

In the case that an error process is carried out (YES at step S74), the control section 10 stops document sheet reading (at step S77), deletes document data having already been read (at step S78), and ends the processing.

Figure 26:
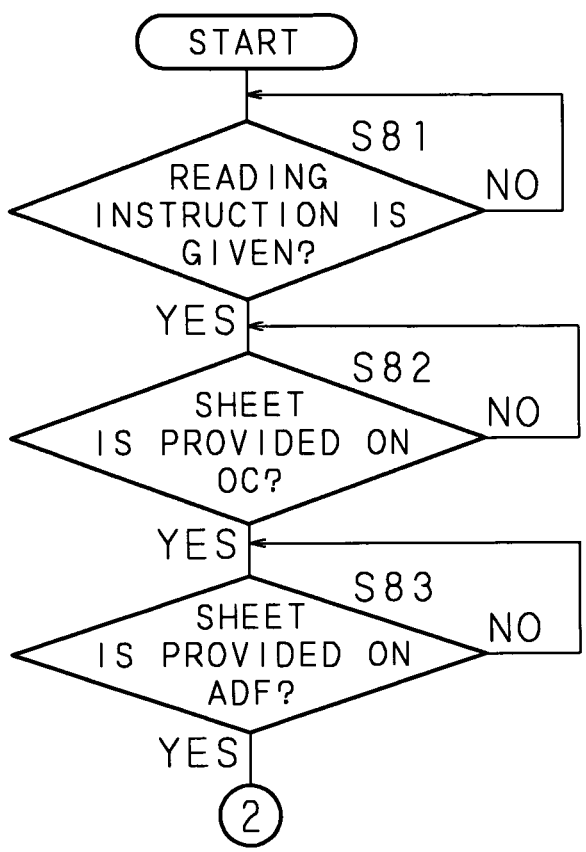
FIG. 26 is a flowchart showing the procedure of the authentication processing carried out by the image reading apparatus using the OC and the ADF simultaneously.
Figure 27:
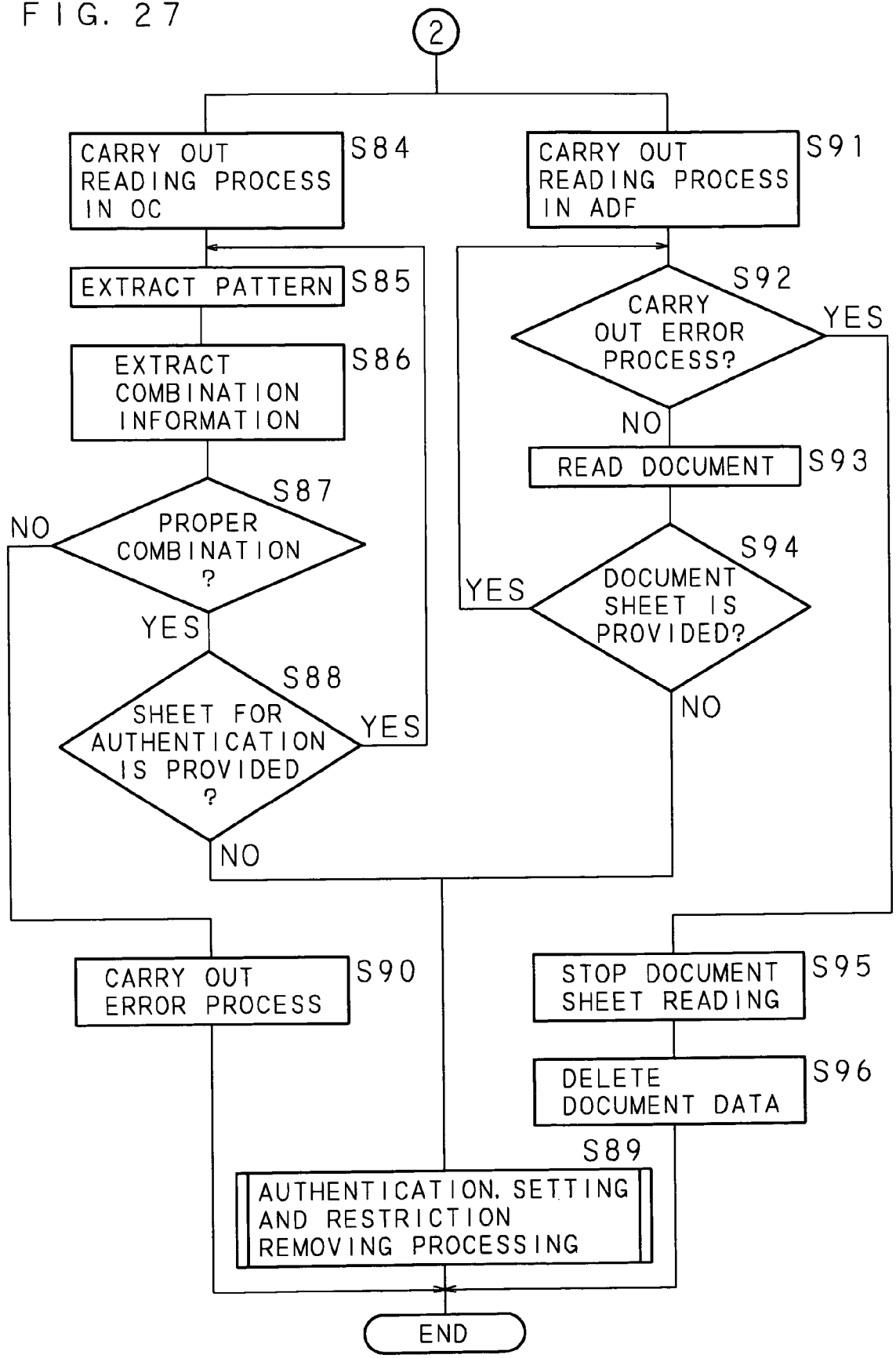
FIG. 27 is a flowchart showing the procedure of the authentication processing carried out by the image reading apparatus using the OC and the ADF simultaneously.

FIGS. 26 and 27 are flowcharts showing the procedure of the authentication processing carried out by the image reading apparatus 1 using an OC and an ADF simultaneously. FIGS. 26 and 27 show a case wherein an authentication sheet having combination information is set on the OC and document sheets are set on the ADF. However, the setting of sheets is not limited to this case. It may also be possible that an authentication sheet is set on the ADF and document sheets are set on the OC. On the basis of the information input from the user interface section 19 or the communication section 11, the control section 10 judges whether a reading instruction is given or not (at step S81). In the case that the reading instruction is not given (NO at step S81), the control section 10 carries out the process of step S81 continuously, thereby standing by until the reading instruction is given.

In the case that the reading instruction is given (YES at step S81), the control section 10 judges whether a sheet is provided on the OC or not (at step S82). In the case that no sheet is provided on the OC (NO at step S82), the control section 10 carries out the process of step S82 continuously, thereby standing by until a sheet is set on the OC.

In the case that a sheet is provided on the OC (YES at step S82), the control section 10 judges whether a sheet is provided on the ADF or not (at step S83). In the case that no sheet is provided on the ADF (NO at step S83), the control section 10 carries out the process of step S83 continuously, thereby standing by until a sheet is set on the ADF. Hence, the control section 10 stands by until a sheet is set on each of the OC and the ADF.

In the case that a sheet is provided on the ADF (YES at step S83), the control section 10 carries out a reading process in the OC (at step S84) and a reading process in the ADF (at step S91) in parallel. For the sake of convenience, the reading process in the OC will be described and then the reading process in the ADF will be described next. However, the process of step S84 and the following processes and the process of step S91 and the following processes are carried out in parallel.

After the reading process is carried out in the OC at step S84, the pattern recognition section 14 extracts a pattern from the sheet having been read (at step S85) and extracts combination information (at step S86). On the basis of the result of the extraction in the pattern recognition section 14, the control section 10 judges whether the combination is proper or not for each sheet having been read (whether the combination of patterns coincides with the combination information or not) (at step S87).

In the case that the control section 10 judges that the combination is proper (YES at step S87), the control section 10 judges whether a sheet for authentication is provided or not (at step S88). In the case that the control section 10 judges that a sheet for authentication is provided (YES at step S88), the control section 10 carries out the process of step S85 continuously. In the case that the control section 10 judges that no sheet for authentication is provided (NO at step S88), the control section 10 carries out authentication, setting and restriction removing processing (at step S89), and ends the processing. Because the authentication, setting and restriction removing processing (at step S89) are the same as the authentication, setting and restriction removing processing (at step S52) shown in FIG. 20, the explanation of the processing is omitted.

In the case that the control section 10 judges that the combination is not proper (NO at step S87), the control section 10 carries out an error process, such as error display (at step S90), and ends the processing.

On the other hand, after the reading process is carried out in the ADF at step S91, the control section 10 judges whether an error process is carried out or not (at step S92).

In the case that no error process is carried out (NO at step S92), the control section 10 reads a document (at step S93), and judges whether a document sheet is provided or not (at step S94). In the case that the control section 10 judges that a document sheet is provided (YES at step S94), the control section 10 carries out the process of step S92 and the following processes continuously. In the case that the control section 10 judges that no document sheet is provided (NO at step S94), the control section 10 carries out the process of step S89 and the following processes continuously.

In the case that an error process is carried out (YES at step S92), the control section 10 stop document sheet reading (at step S95), deletes document data having already been read (at step S96), and ends the processing.

Figure 28:
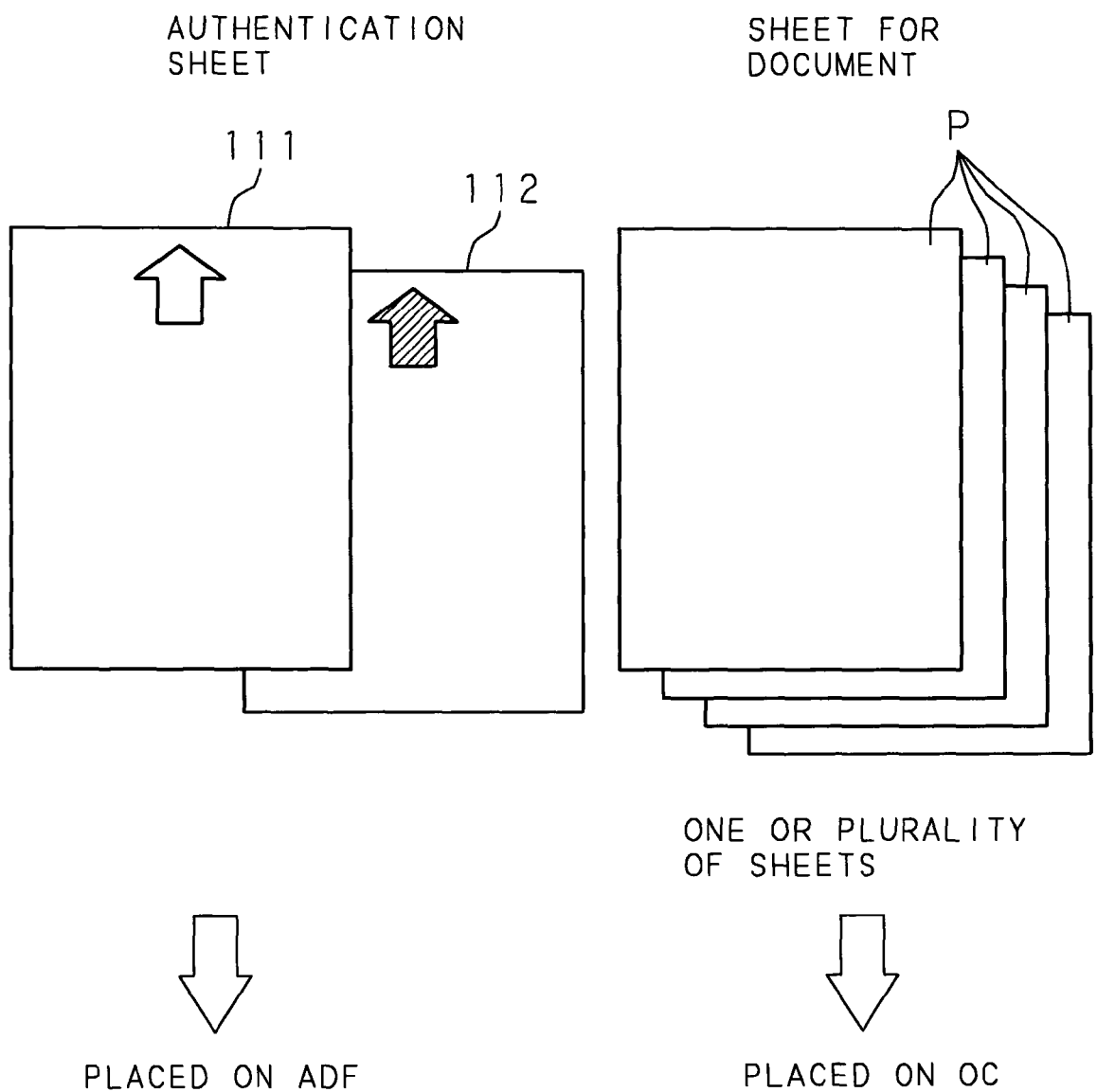
FIG. 28 is a schematic view showing another example of overlays of authentication sheets and document sheets.
Figure 29:
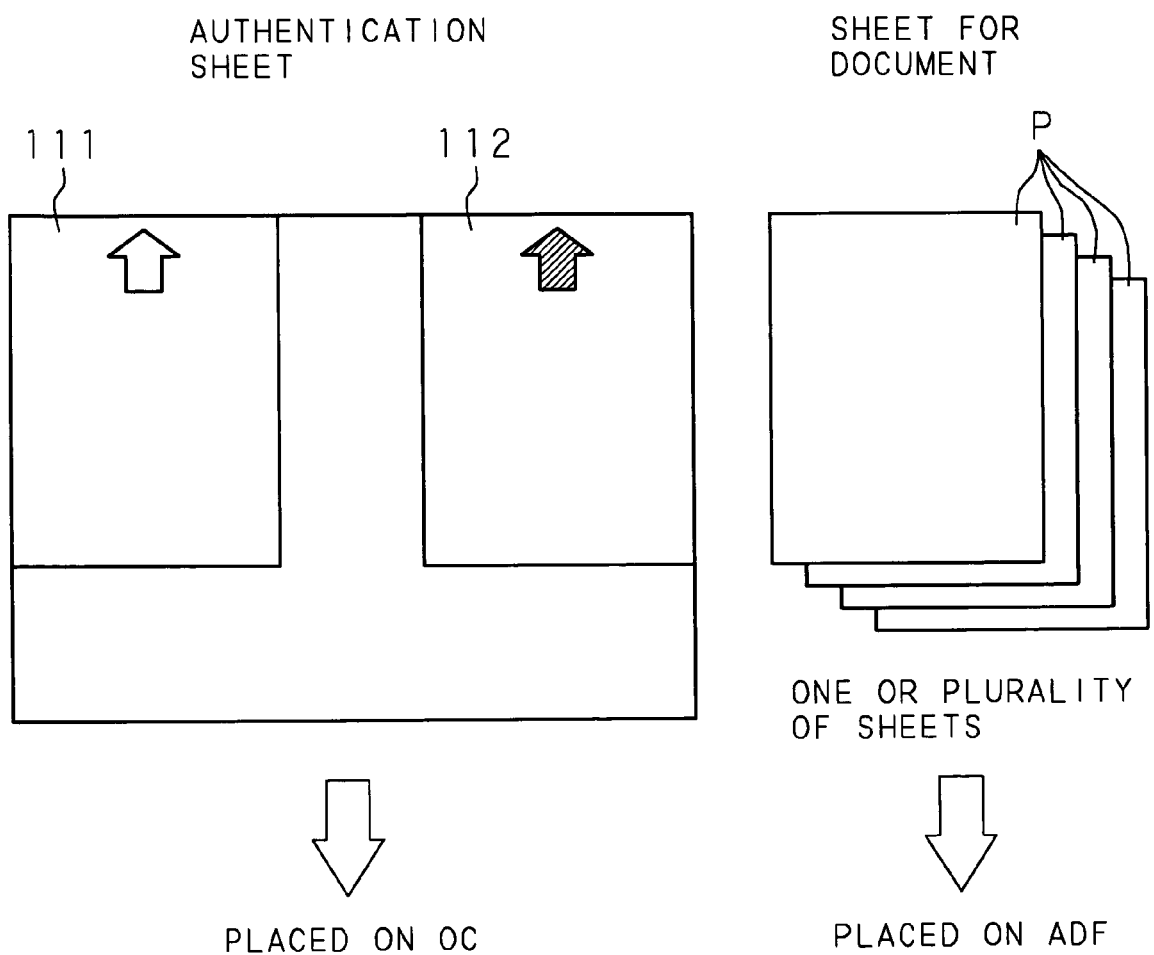
FIG. 29 is a schematic view showing still another example of overlays of authentication sheets and document sheets.

FIGS. 28 and 29 are schematic views showing other examples of overlays of authentication sheets and document sheets. FIG. 28 shows an example wherein two authentication sheets 111 and 112 on which patterns are recorded are overlaid and placed on an ADF, and document sheets P, . . . are overlaid and placed on an OC. FIG. 29 shows an example wherein the authentication sheets 111 and 112 are overlaid and placed on the plate of the OC while being spaced therebetween, and document sheets P, . . . are overlaid and placed on the ADF. The authentication sheets 111 and 112 may be an authentication sheet for user authentication, an explanation sheet, a setting sheet or a restriction removing sheet, or may be a combination of these. Furthermore, in the case that the content (for example, pattern combination information) of an explanation sheet is recorded in an authentication sheet, a setting sheet or a restriction removing sheet using a QR code or the like, it is not necessary to place the explanation sheet.

Figure 30:
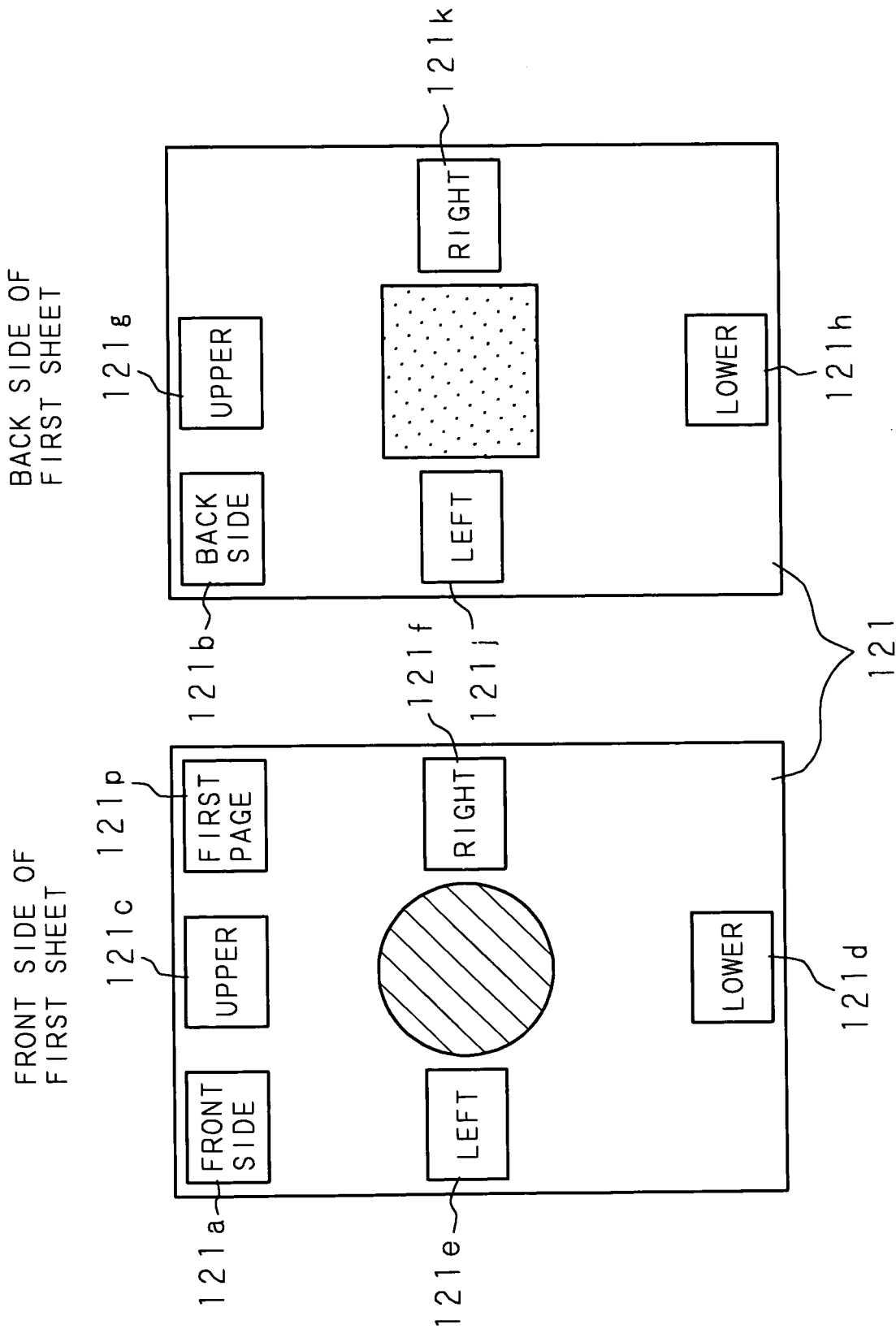
FIG. 30 is a schematic view showing another example of a sheet for authentication (an authentication sheet, a setting sheet, a restriction removing sheet or an explanation sheet)

In the embodiment described above, an arrow-shaped indicator showing the orientation (upper-lower/left-right orientation), the side (front/rear side) and the page number of a sheet for authentication is used. However, the indicator is not limited to this arrow-shaped indicator. FIG. 30 is a schematic view showing another example of a sheet 121 for authentication (an authentication sheet, a setting sheet, a restriction removing sheet or an explanation sheet). As shown in FIG. 30, indicators 121a and 121b distinguishing the front/back sides of the sheet 121, indicators 121c, 121d, 121e, 121f, 121g, 121h, 121j and 121k indicating the upper, lower, left and right orientations of the sheet 121, and an indicator 121p indicating the page number of the sheet 121 are provided to indicate the reading order, the placement position on the plate and the orientation of the sheet 121. The user can thus easily set sheets for authentication.

Embodiment 2

Embodiment 1 described above is configured so that the process for judging whether the combination of a plurality of patterns coincides with the combination information or not is carried out inside the image reading apparatus 1. However, it may also be possible to have a configuration wherein the authentication information of the user, the setting information for function setting, the restriction removing information for function restriction removing, etc. are controlled inside a server, and the image reading apparatus 1 gains access to the server as necessary to carry out the recognition process, setting process and restriction removing process.

Figure 31:
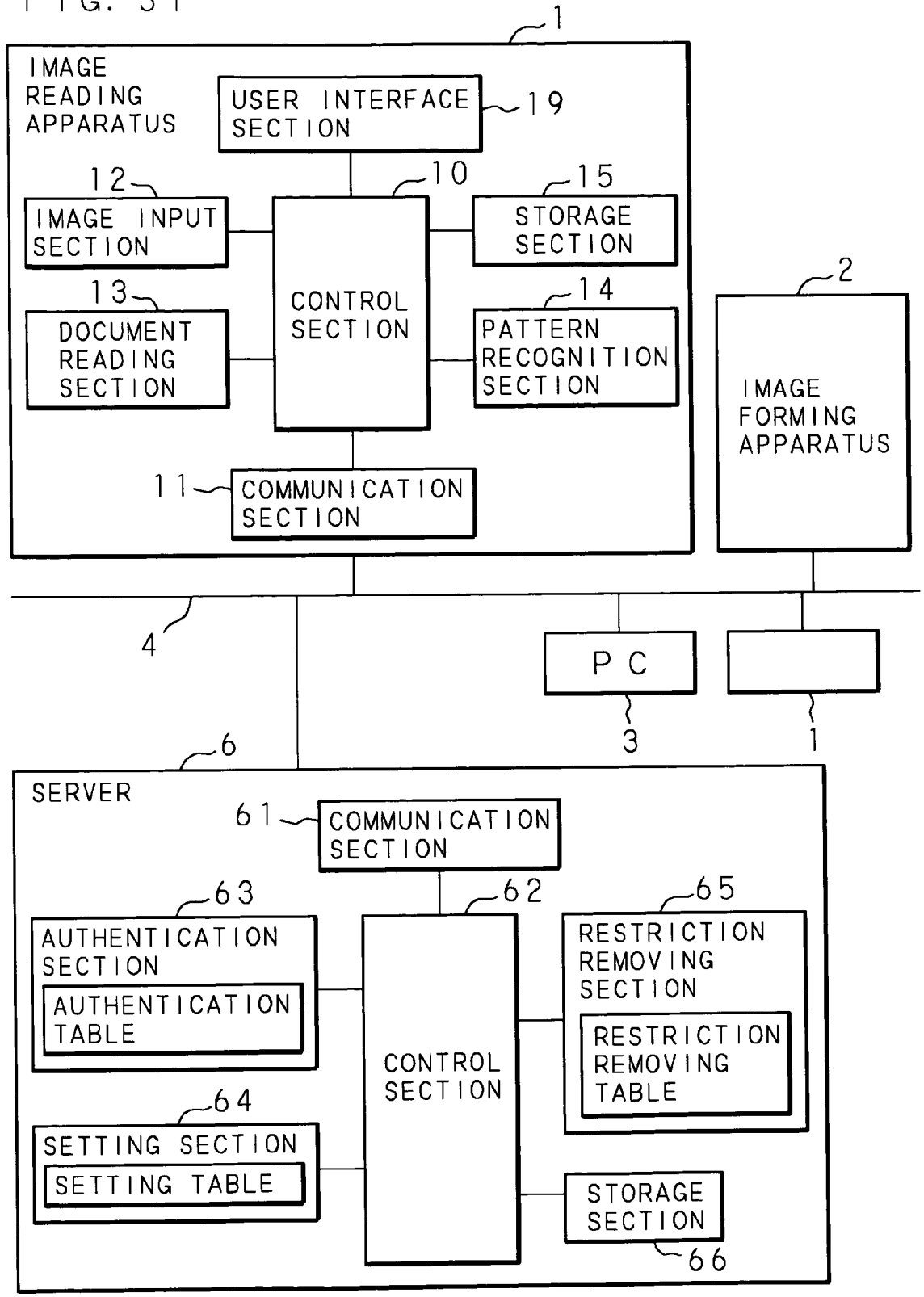
FIG. 31 is a block diagram showing the configuration of an image processing system having the image reading apparatus according to the present invention.

FIG. 31 is a block diagram showing the configuration of an image processing system having an image reading apparatus 1 according to the present invention. The image processing system comprises the image reading apparatus 1 and a server 6 connected to the image reading apparatus 1 via a communication line 4. Furthermore, to the communication line 4, a personal computer (PC) 3 that functions as the terminal unit of a user, another image reading apparatus 1, an image forming apparatus 2, etc. are connected.

The server 6 has a control section 62 comprising a CPU that performs various calculations, a built-in memory, etc. To the control section 62, a communication section 61, an authentication section 63, a setting section 64, a restriction removing section 65, a communication section 61, a storage section 66, etc. are connected via internal buses, and the control section 62 controls the operations of these hardware sections.

The operation of each hardware section is similar to that described in Embodiment 1. In other words, in terms of functions, the control section 62 is similar to the control section 10, the authentication section 63 is similar to the authentication section 16, the setting section 64 is similar to the setting section 17, and the restriction removing section 65 is similar to the restriction removing section 18. Furthermore, the image reading apparatus 1 is similar to the image reading apparatus 1 according to Embodiment 1, except that the image reading apparatus 1 according to Embodiment 2 does not include the authentication section 16, the setting section 17 and the restriction removing section 18.

In the image reading apparatus 1, the pattern recognition section 14 extracts the patterns recorded on an authentication sheet, and also extracts the combination information regarding the combination of a plurality of patterns recorded on an explanation sheet or the combination information recorded in a QR code. The control section 10 outputs the extracted patterns and combination information to the server 6 via the communication section 11.

In the server 6, on the basis of the patterns and the combination information output from the image reading apparatus 1, the authentication section 63 carries out a user authentication judgment process, the setting section 64 carries out a function setting judgment process, and the restriction removing section 65 carries out a function restriction removing judgment process. In addition, the server 6 outputs the results of the processes to the image reading apparatus 1 via the communication section 61 under the control of the control section 62.

The image reading apparatus 1 obtains the results of the processes output from the server 6, and carries out a device enabling/disabling process, a function setting process and a function restriction removing process on the basis of the obtained results.

Because this embodiment is configured such that the server 6 carries out the user authentication judgment process, the function setting judgment process and the function restriction removing judgment process as described above, even if a plurality of image reading apparatuses 1 are connected to the communication line 4, each image reading apparatus 1 is not required to carry out any authentication judgment processes and not required to store the information regarding the judgment processes. Furthermore, the server 6 can carry out the centralized control of the authentication processes for the a plurality of image reading apparatuses 1, . . . , thereby improving convenience in view of information control.

Embodiment 3

In Embodiment 1 described above, the image reading apparatus 1 and the image forming apparatus 2 are configured as two different apparatuses. However, the image reading apparatus 1 and the image forming apparatus 2 can be integrated. For example, the image reading apparatus and the image forming apparatus according to the present invention can be integrated into a configuration that is applied to a digital multifunctional apparatus.

FIG. 32 is a block diagram showing the internal configuration of a digital multifunctional apparatus 7 according to Embodiment 3. The digital multifunctional apparatus 7 has a control section 70 comprising a CPU that performs various calculations, a built-in memory, etc. To the control section 70, a communication section 71, an image input section 72, a document reading section 73, a pattern recognition section 74, an image forming section 75, a storage section 76, an authentication section 77, a setting section 78, a restriction removing section 79, a user interface section 80, etc. are connected via internal buses, and the control section 70 controls the operations of these hardware sections.

Because the operations of the hardware sections, that is, the operations of the control section 70, the communication section 71, the image input section 72, the document reading section 73, the pattern recognition section 74, the image forming section 75, the storage section 76, the authentication section 77, the setting section 78, the restriction removing section 79 and the user interface section 80 are similar to the operations of the control section 10, the communication section 11, the image input section 12, the document reading section 13, the pattern recognition section 14, the image forming section 21, the storage section 15, the authentication section 16, the setting section 17, the restriction removing section 18 and the user interface section 19, respectively, the explanations of the operations are omitted.

As described above, in the present invention, on the basis of the result of the judgment as to whether the combination of a plurality of the patterns extracted from the images recorded on sheets coincides with the combination information regarding the combination of the patterns or not, predetermined processing (a user authentication process, a function setting process, a function restriction removing process, etc.) is carried out. Hence, even if one or more sheets on which the patterns are recorded are stolen or copied, the method for combining the sheets is not leaked. Authentication for carrying out the predetermined processing is done only after both of the sheets on which the patterns are recorded and the combination information of the patterns are obtained completely. Therefore, this method that requires two items for authentication is improved in security against unauthorized use in comparison with a method that requires only one item. In addition, because authentication can be carried out by extracting the patterns recorded on sheets and the combination information of the patterns, a separate device, such as a bar code reader, is not required, and input operation at such a touch panel is not required either. Furthermore, it is only necessary to use sheets that are read using reading means. Therefore, authentication can be done easily at low cost, and the convenience for the user is improved.

In the embodiments described above, the pattern recognition section 14, the authentication section 16, the setting section 17 and the restriction removing section 18 are formed of ASICs separate from that of the control section 10. However, without being limited to this, the sections can be integrated into the control section 10 and can be formed of one IC chip.

In the embodiments described above, a QR code formed of encrypted combination information is used. However, without being limited to this, two-dimensional codes and the like that cannot be recognized from the appearance can also be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image reading apparatus comprising:
   a reading section for reading images recorded on sheets; and
   a controller capable of performing operations of:
   extracting a plurality of patterns from a first image on a sheet read using said reading section;
   extracting a combination information regarding a combination of a plurality of the patterns from a second image on a different sheet from the sheet read using said reading section,
   judging whether the combination of the extracted a plurality of patterns of the first image coincides with the combination designated using the extracted combination information of the second image; and
   carrying out predetermined processing according to the result of the judgment.

2. The image reading apparatus according to claim 1, wherein, in the case that the combination of said patterns coincides with the combination designated using said combination information, said controller is further capable of carrying out said predetermined processing for images recorded on the sheets that are read after the sheets from which said patterns or said combination information is extracted.

3. The image reading apparatus according to claim 1, further comprising a memory for storing images on the sheets read using said reading section, wherein, in the case that the combination of said patterns coincides with the combination designated using said combination information, said controller is further capable of carrying out said predetermined processing for the images recorded on the sheets that are read between a plurality of sheets from which said patterns or said combination information is extracted.

4. The image reading apparatus according to claim 1, wherein
   said reading section is provided in plural numbers; and
   said controller is further capable of performing operations of extracting a plurality of patterns from the first image on said sheet, said sheet being read using one reading section; and
   extracting the combination information regarding the combination of said patterns from the second image on said different sheet, said different sheet being read using another reading section.

5. The image reading apparatus according to claim 1, wherein
   said reading section is provided in plural numbers; and
   said controller is further capable of performing operations of:
   extracting a plurality of patterns and the combination information regarding the combination of a plurality of the patterns from the first image and the second image on the sheets respectively read using one reading section; and reading the first image and the second image on the sheets using another reading section in the case that it is judged that the combination of the extracted a plurality of patterns coincides with the combination designated using the extracted combination information.

6. The image reading apparatus according to claim 1, wherein said reading section reads a plurality of sheets sequentially or simultaneously.

7. The image reading apparatus according to claim 1, wherein said controller is further capable of prohibiting the execution of said predetermined processing in the case that it is judged that the combination of said patterns does not coincide with the combination designated using said combination information.

8. The image reading apparatus according to claim 1, wherein said combination information includes authentication information regarding the user; and
said controller is further capable of carrying out user authentication using the authentication information included in the extracted combination information.

9. The image reading apparatus according to claim 1, wherein said combination information is information including setting conditions for said processing; and
said controller is further capable of carrying out the setting for said processing that should be carried out according to the setting conditions included in the extracted combination information.

10. The image reading apparatus according to claim 1, wherein said combination information is information including restriction removing conditions for said processing; and
said controller is further capable of carrying out the restriction removing for the processing that should be carried out according to the restriction removing conditions included in the extracted combination information.

11. The image reading apparatus according to claim 1, wherein said combination information is information regarding the order or positions of the patterns.

12. An image reading apparatus comprising:
reading means for reading images recorded on sheets; and
first extracting means for extracting a plurality of patterns from a first image on a sheet read using said reading means,
second extracting means for extracting a combination information regarding a combination of a plurality of the patterns from a second image on a different sheet from the sheet read using said reading means,
judging means for judging whether the combination of the extracted a plurality of patterns of the first image coincides with the combination designated using the extracted combination information of the second image; and
means for carrying out predetermined processing on the basis of the result of the judgment made using said judging means.

13. The image reading apparatus according to claim 12, wherein
said reading means is provided in plural numbers;
said first extracting means extracts a plurality of patterns from the first image on said sheet, said sheet being read using one reading means; and
said second extracting means extracts the combination information regarding the combination of a plurality of the patterns from the second image on said different sheet, said different sheet being read using another reading means.

14. An image forming apparatus comprising:
an image forming section for forming images that can be read by the image reading apparatus according to claim 1 on sheets.

15. The image forming apparatus according to claim 14, further comprising a displaying section for displaying the combination information regarding the combination of a plurality of the patterns.

16. An image processing system comprising:
the image reading apparatus according to claim 1; and
an information processing apparatus; wherein
said image reading apparatus further comprises:
a controller capable of performing operations of:
outputting the said extracted a plurality of patterns and combination information to said information processing apparatus; and
carrying out predetermined processing on the basis of an output received from said information processing apparatus; and
said information processing apparatus comprises:
a controller capable of performing operations of:
obtaining said a plurality of the patterns and the combination information output from said image reading apparatus;
judging whether the combination of the obtained a plurality of patterns coincides with the combination designated using the extracted combination information or not; and
outputting the information regarding a result of the judgment to said image reading apparatus.

17. An image processing system comprising:
the image reading apparatus according to claim 1; and
an information processing apparatus; wherein
said image reading apparatus further comprises:
means for outputting said extracted a plurality of the patterns and the combination information to said information processing apparatus; and
means for carrying out predetermined processing on the basis of an output received from said information processing apparatus; and
said information processing apparatus comprises:
means for obtaining said a plurality of the patterns and the combination information output from said information processing apparatus;
judging means for judging whether the combination of the obtained said a plurality of patterns coincides with the combination designated using the extracted combination information or not; and
means for outputting the information regarding the result of the judgment made using said judging means to said image reading apparatus.

18. An image reading method using the image reading apparatus according to claim 1, comprising the steps of:
reading images recorded on sheets;
extracting a plurality of patterns and the information regarding the combination of the patterns from the first image and the second image on the different sheets having been read;
judging whether the combination of the extracted a plurality of patterns coincides with the combination designated using the extracted combination information or not; and
carrying out predetermined processing according to the result of the judgment.

* * * * *